(12) United States Patent
Sasaki

(10) Patent No.: US 12,249,465 B2
(45) Date of Patent: Mar. 11, 2025

(54) MULTILAYER CERAMIC CAPACITOR

(71) Applicant: Murata Manufacturing Co., Ltd., Nagaokakyo (JP)

(72) Inventor: Tomohiro Sasaki, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 17/585,648

(22) Filed: Jan. 27, 2022

(65) Prior Publication Data
US 2022/0270825 A1    Aug. 25, 2022

(30) Foreign Application Priority Data
Feb. 24, 2021    (JP) .................................. 2021-027614

(51) Int. Cl.
| | |
|---|---|
| *H01G 4/30* | (2006.01) |
| *H01G 4/008* | (2006.01) |
| *H01G 4/012* | (2006.01) |
| *H01G 4/12* | (2006.01) |
| *H01G 4/232* | (2006.01) |

(52) U.S. Cl.
CPC ............... *H01G 4/30* (2013.01); *H01G 4/008* (2013.01); *H01G 4/012* (2013.01); *H01G 4/12* (2013.01); *H01G 4/232* (2013.01)

(58) Field of Classification Search
CPC ............ H01G 4/30; H01G 4/232; H01G 4/12; H01G 4/012; H01G 4/008; H01G 4/005
USPC ............ 361/301.4, 306.3, 303, 321.1, 321.3, 361/321.2
See application file for complete search history.

(56) References Cited

U.S. PATENT DOCUMENTS

| | | | | |
|---|---|---|---|---|
| 4,665,465 A | * | 5/1987 | Tanabe ...................... | H01G 4/35 |
| | | | | 361/306.3 |
| 2003/0011962 A1 | * | 1/2003 | Yamamoto ............... | H01G 4/30 |
| | | | | 361/321.2 |
| 2006/0279903 A1 | * | 12/2006 | Togashi .................. | H01G 4/232 |
| | | | | 361/303 |

(Continued)

FOREIGN PATENT DOCUMENTS

| | | |
|---|---|---|
| JP | 02-082022 U | 6/1990 |
| JP | 2007-019101 A | 1/2007 |

(Continued)

OTHER PUBLICATIONS

Office Action in JP2021-027614, mailed Jul. 11, 2023, 9 pages.

*Primary Examiner* — Arun Ramaswamy
(74) *Attorney, Agent, or Firm* — Keating & Bennett, LLP

(57) ABSTRACT

A multilayer ceramic capacitor includes a multilayer body in which dielectric layers are laminated, first and second internal electrode layers extending to both end surfaces of the multilayer body, first and second external electrodes connected to the first internal electrode layer and disposed on both end surfaces, and third and fourth external electrodes connected to the second internal electrode layer and disposed on both side surfaces. A number of the first internal electrode layers is greater than a number of the second internal electrode layers, and at least two first internal electrode layers are continuously laminated. In the first internal electrode layer, a recess is provided so as not to overlap the third and fourth external electrodes on a portion of both principal surfaces when the multilayer ceramic capacitor is viewed from a height direction.

20 Claims, 13 Drawing Sheets

(56) References Cited

U.S. PATENT DOCUMENTS

| | | | |
|---|---|---|---|
| 2008/0186652 A1* | 8/2008 | Lee ........................ | H01G 4/232 |
| | | | 361/306.3 |
| 2009/0034152 A1* | 2/2009 | Aoki ........................ | H01G 4/35 |
| | | | 29/25.42 |
| 2012/0120546 A1* | 5/2012 | Togashi ................... | H01G 4/35 |
| | | | 361/302 |
| 2012/0250218 A1 | 10/2012 | Togashi et al. | |
| 2012/0320495 A1* | 12/2012 | Akazawa ............... | H01G 4/005 |
| | | | 361/321.2 |
| 2016/0049252 A1* | 2/2016 | Park ........................ | H01G 4/30 |
| | | | 174/258 |
| 2017/0294268 A1* | 10/2017 | Katsuta ................. | H01G 4/232 |
| 2018/0286583 A1* | 10/2018 | Onoue ................... | H01G 4/012 |

FOREIGN PATENT DOCUMENTS

| | | | |
|---|---|---|---|
| JP | 2010287708 A | | 12/2010 |
| JP | 2011-049490 A | | 3/2011 |
| JP | 2011187674 A | | 9/2011 |
| JP | 2012104736 A | | 5/2012 |
| JP | 2012-221993 A | | 11/2012 |
| JP | 2012248571 A | * | 12/2012 |
| JP | 2014-146754 A | | 8/2014 |

\* cited by examiner

SECTIONAL VIEW TAKEN ALONG LINE V-V

SECTIONAL VIEW TAKEN ALONG LINE XIA-XIA

SECTIONAL VIEW TAKEN ALONG LINE XIB-XIB

MULTILAYER CERAMIC CAPACITOR

CROSS REFERENCE TO RELATED APPLICATIONS

This application claims the benefit of priority to Japanese Patent Application No. 2021-027614 filed on Feb. 24, 2021. The entire contents of this application are hereby incorporated herein by reference.

BACKGROUND OF THE INVENTION

1. Field of the Invention

The present invention relates to a multilayer ceramic capacitor.

2. Description of the Related Art

For example, a chip-shaped electronic component having a general structure as described in Utility Model Laying-Open No. 02-082022 is known as a decoupling capacitor used to stabilize a power supply voltage supplied to an integrated circuit component (IC) operating at a high speed and a noise countermeasure component of a power supply line supplied to the integrated circuit component (IC).

In the chip-shaped electronic component described in Utility Model Laid-Open No. 02-082022, a plurality of dielectric green sheets in which a through electrode is printed on one surface and a plurality of dielectric green sheets in which a capacitor electrode is printed on one surface in a direction orthogonal to the through electrode are alternately laminated, and an external electrode is connected to the through electrode and the capacitor electrode.

However, for example, in a feedthrough capacitor as described in Utility Model Laid-Open No. 02-082022, in order to further reduce the capacitance, when the capacitor electrode is disposed on an outermost surface side of an electronic component body, a width of the capacitor electrode is smaller than a width of the external electrode connected to a capacitor electrode side, and the external electrode connected to the capacitor electrode side overlaps the feedthrough electrode as viewed in a lamination direction. In this case, when a high electric field is applied, the electric field concentrates in a portion where the feedthrough electrode and the external electrode overlap each other, and sometimes dielectric breakdown is generated between the external electrode connected to the capacitor electrode side and the feedthrough electrode.

SUMMARY OF THE INVENTION

Preferred embodiments of the present invention provide multilayer ceramic capacitors each able to reduce the capacitance of the capacitor and reduce or prevent dielectric breakdown generated between an internal electrode layer and an external electrode even when a high electric field is applied.

According to a preferred embodiment of the present invention, a multilayer ceramic capacitor includes a multilayer body including a plurality of laminated dielectric layers, the multilayer body including a first principal surface and a second principal surface facing each other in a height direction, a first end surface and a second end surface facing each other in a length direction orthogonal or substantially orthogonal to the height direction, and a first side surface and a second side surface facing each other in a width direction orthogonal or substantially orthogonal to the height direction and the length direction, a plurality of first internal electrode layers on the plurality of dielectric layers and extending to the first end surface and the second end surface, a plurality of second internal electrode layers on the plurality of dielectric layers and extending to the first side surface and the second side surface, a first external electrode on the first end surface and connected to the first internal electrode layer, a second external electrode on the second end surface and connected to the first internal electrode layer, a third external electrode on the first side surface, extending from the first side surface, a portion of the first principal surface and a portion of the second principal surface, and connected to the second internal electrode layer, and a fourth external electrode on the second side surface, extending from the second side surface to a portion of the first principal surface and a portion of the second principal surface, and connected to the second internal electrode layer. A number of the first internal electrode layers is greater than a number of the second internal electrode layers, and at least two first internal electrode layers are continuously laminated, the first internal electrode layer includes a recess not overlapping the third external electrode on a portion of the first principal surface and a portion of the second principal surface and the fourth external electrode on a portion of the first principal surface and a portion of the second principal surface when the multilayer ceramic capacitor is viewed from the height direction, the second internal electrode layer is disposed at least between the first internal electrode layer located closest to the first principal surface and the first principal surface and at least between the first internal electrode layer located closest to the second principal surface and the second principal surface, and a length in the length direction of the second internal electrode layer is smaller than a maximum length in the length direction of the third external electrode on a portion of the first principal surface and a portion of the second principal surface and the fourth external electrode on a portion of the first principal surface and a portion of the second principal surface.

In the multilayer ceramic capacitor described above, the number of the first internal electrode layers is greater than the number of the second internal electrode layers, and at least two first internal electrode layers are continuously laminated, so that the capacitance of the multilayer ceramic capacitor is prevented from increasing, and not only the number of the first internal electrode layers is increased to increase the number of the first internal electrode layers connected in parallel, but also conductivity between the first internal electrode layers and the external electrode is improved, so that the increase in direct-current resistance is able to be reduced or prevented.

In addition, in the multilayer ceramic capacitor described above, the recess is provided such that the first internal electrode layer does not overlap the third external electrode disposed on a portion of the first principal surface and a portion of the second principal surface and the fourth external electrode on a portion of the first principal surface and a portion of the second principal surface when the multilayer ceramic capacitor is viewed from the height direction, so that the dielectric breakdown between the third external electrode and the fourth external electrode that are connected to the second internal electrode layer and the first internal electrode layer can be reduced or prevented even when the high electric field is applied to the multilayer ceramic capacitor.

Furthermore, in the multilayer ceramic capacitor described above, the second internal electrode layer is disposed at least between the first internal electrode layer located closest to the first principal surface and the first principal surface and at least between the first internal electrode layer located closest to the second principal surface and the second principal surface, so that a current path to the mounting substrate is shortened while a low ESL effect is obtained, and the dielectric breakdown between the first internal electrode layer and the third external electrode and the fourth external electrode that are connected to the second internal electrode layer is able to be reduced or prevented even when the high electric field is applied to the multilayer ceramic capacitor. As a result, a dielectric breakdown voltage (BDV) of the multilayer ceramic capacitor is able to be improved.

Furthermore, in the multilayer ceramic capacitor described above, the length in the length direction of the second internal electrode layer is smaller than the maximum length in the length direction of the third external electrode disposed on a portion of the first principal surface and a portion of the second principal surface and the fourth external electrode disposed on a portion of the first principal surface and a portion of the second principal surface, so that the capacitance is able to be further reduced while the DC resistance is reduced.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
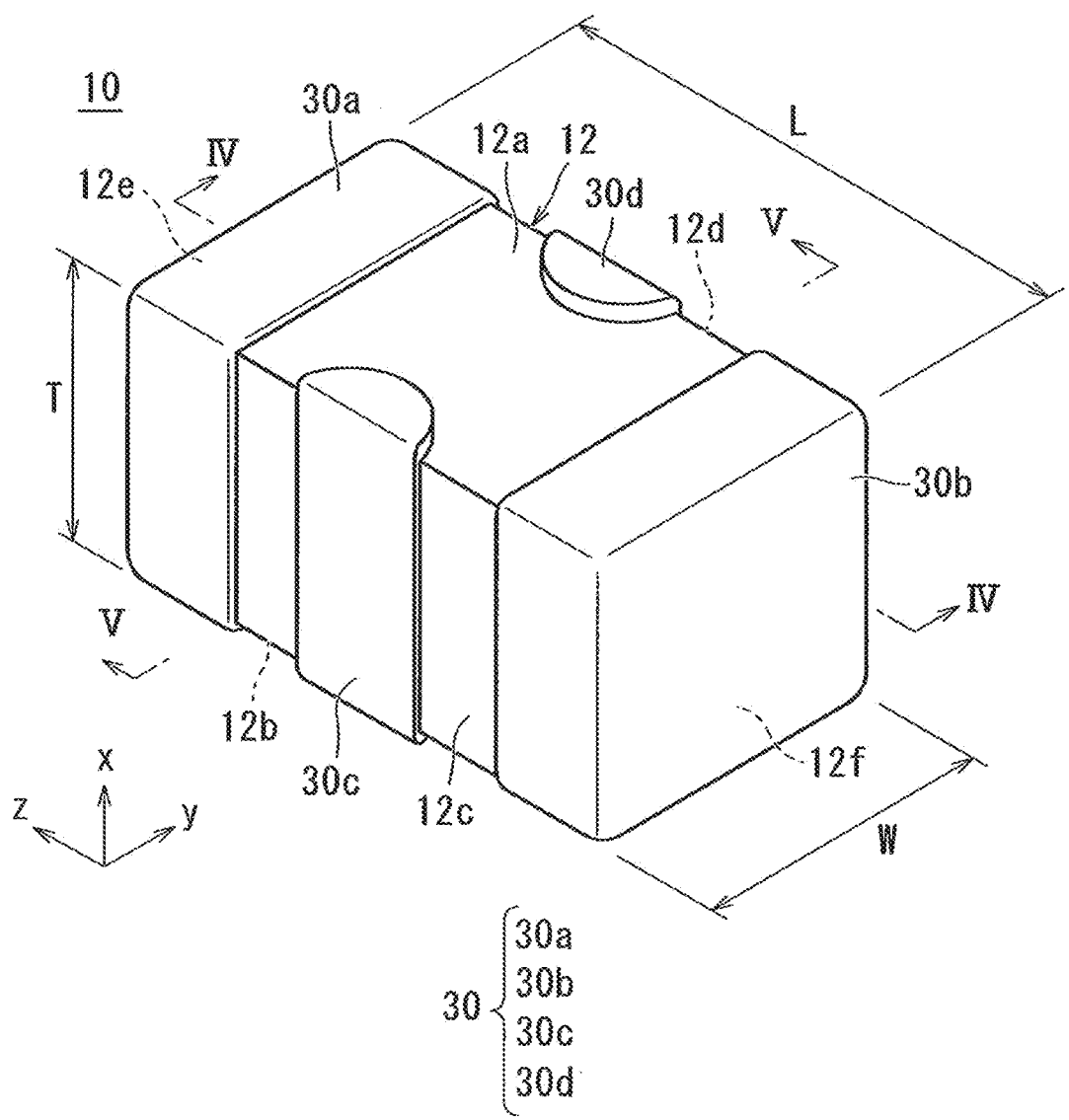
FIG. 1 is an external perspective view illustrating an example of a multilayer ceramic capacitor (three-terminal multilayer ceramic capacitor) according to a preferred embodiment of the present invention.

Hereinafter, preferred embodiments of the present invention will be described in detail with reference to the drawings. In the following preferred embodiments, the same or corresponding portions are denoted by the same reference numerals in the drawings, and the description will not be repeated.

1. Multilayer Ceramic Capacitor

A multilayer ceramic capacitor according to a preferred embodiment of the present invention will be described. The multilayer ceramic capacitor of the present preferred embodiment is, for example, a three-terminal multilayer ceramic capacitor.

Figure 2A:
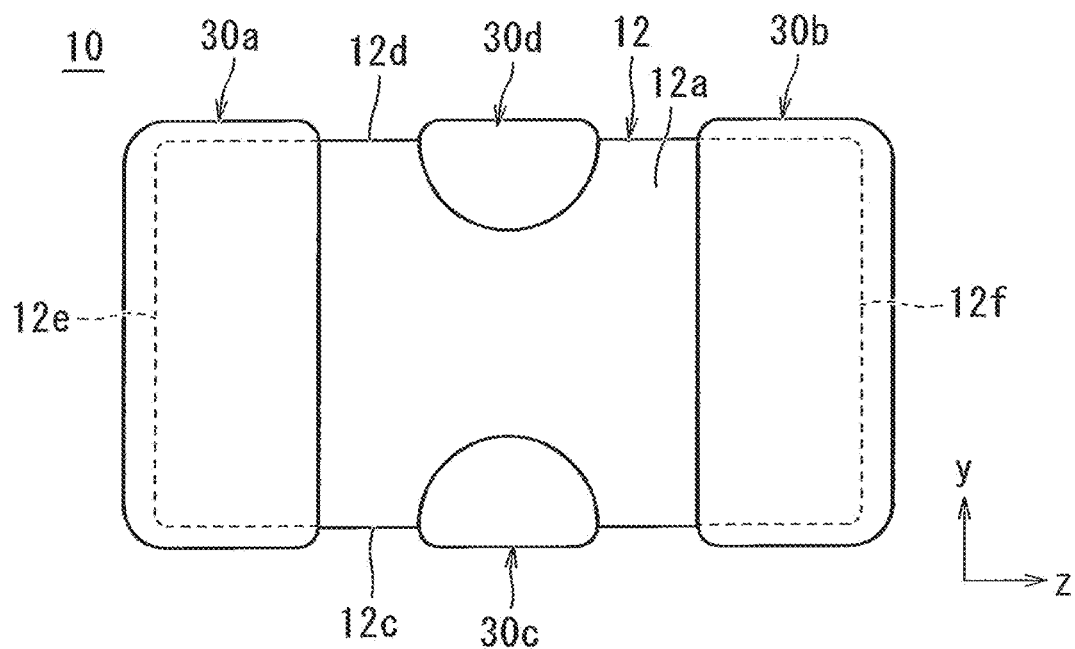
FIG. 2A is a top view illustrating an example of a multilayer ceramic capacitor (three-terminal multilayer ceramic capacitor) according to a preferred embodiment of the present invention.
Figure 2B:
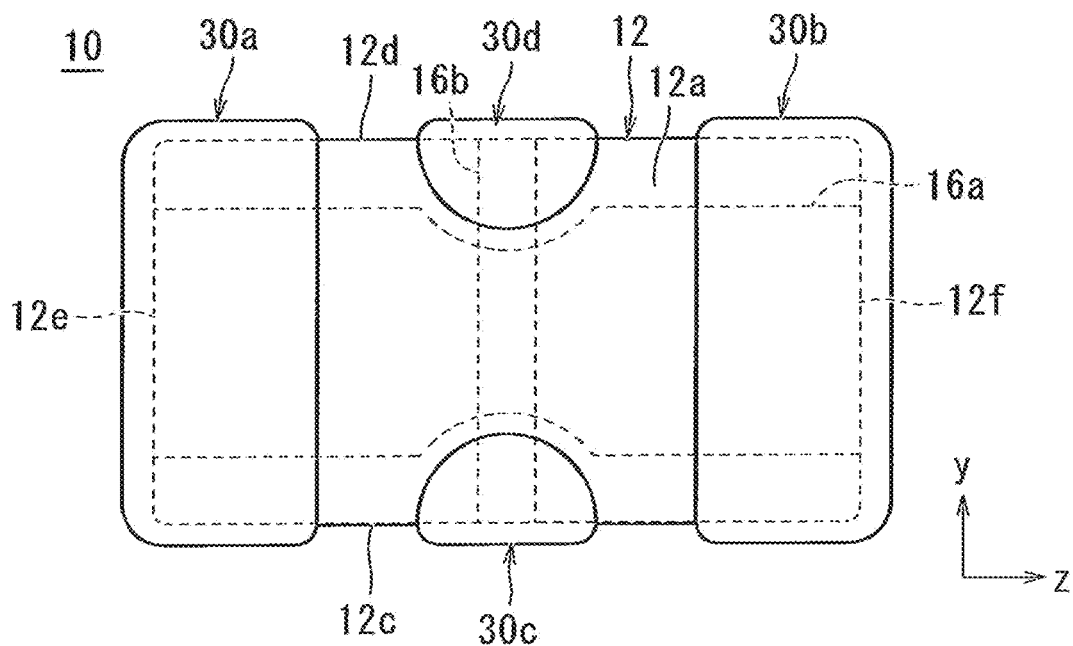
FIG. 2B is a transmission view illustrating each internal electrode layer viewed from the top view in FIG. 2A.
Figure 3:
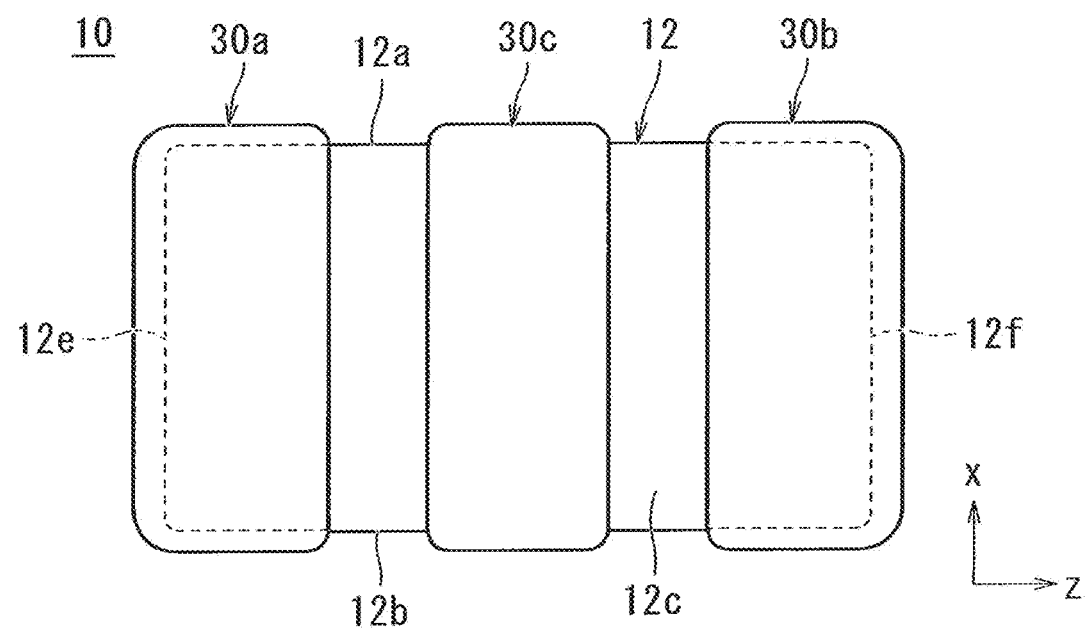
FIG. 3 is a side view illustrating an example of a multilayer ceramic capacitor (three-terminal multilayer ceramic capacitor) according to a preferred embodiment of the present invention.
Figure 4:
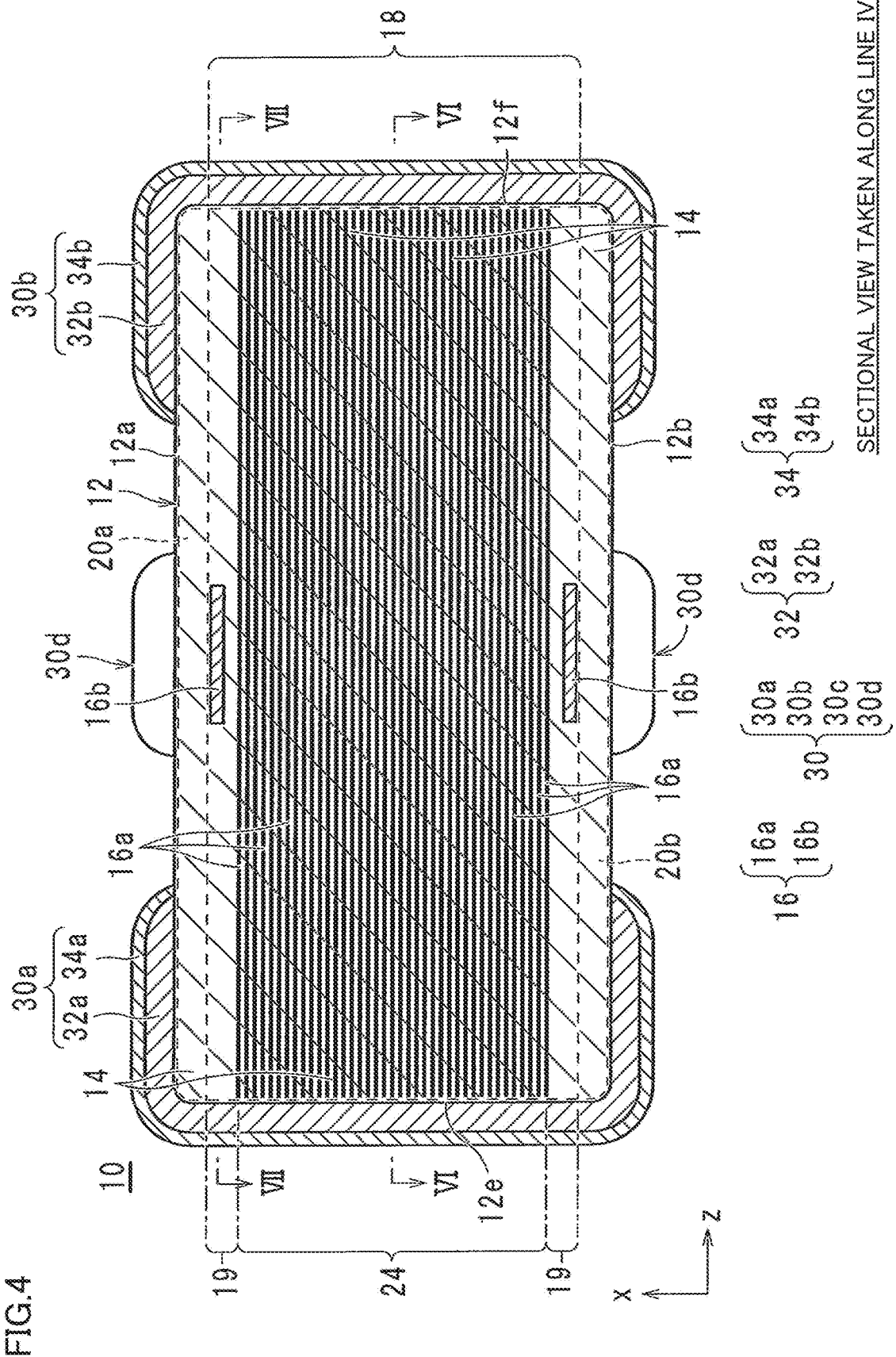
FIG. 4 is a sectional view taken along a line IV-IV in FIG. 1.
Figure 5:
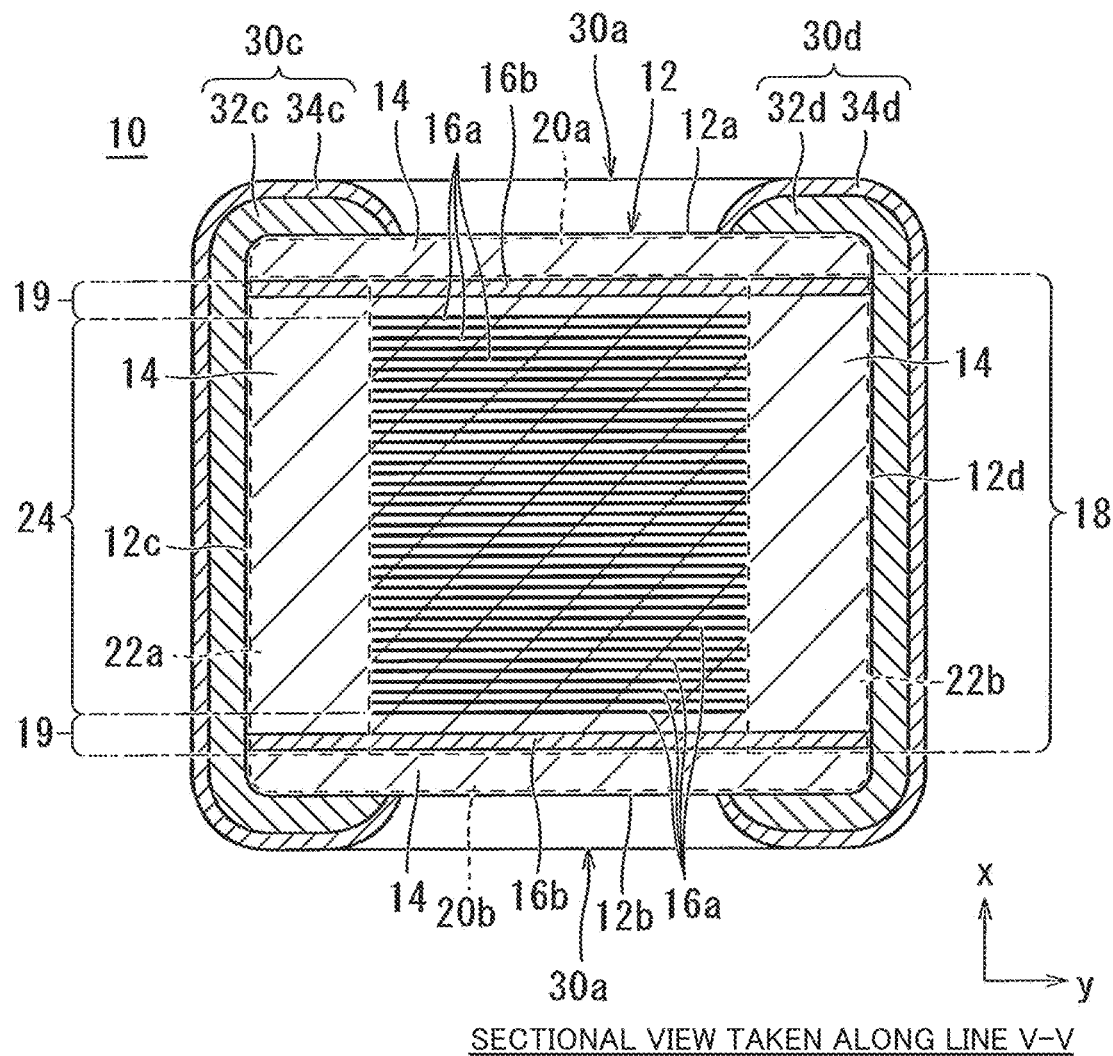
FIG. 5 is a sectional view taken along a line V-V in FIG. 1.
Figure 6:
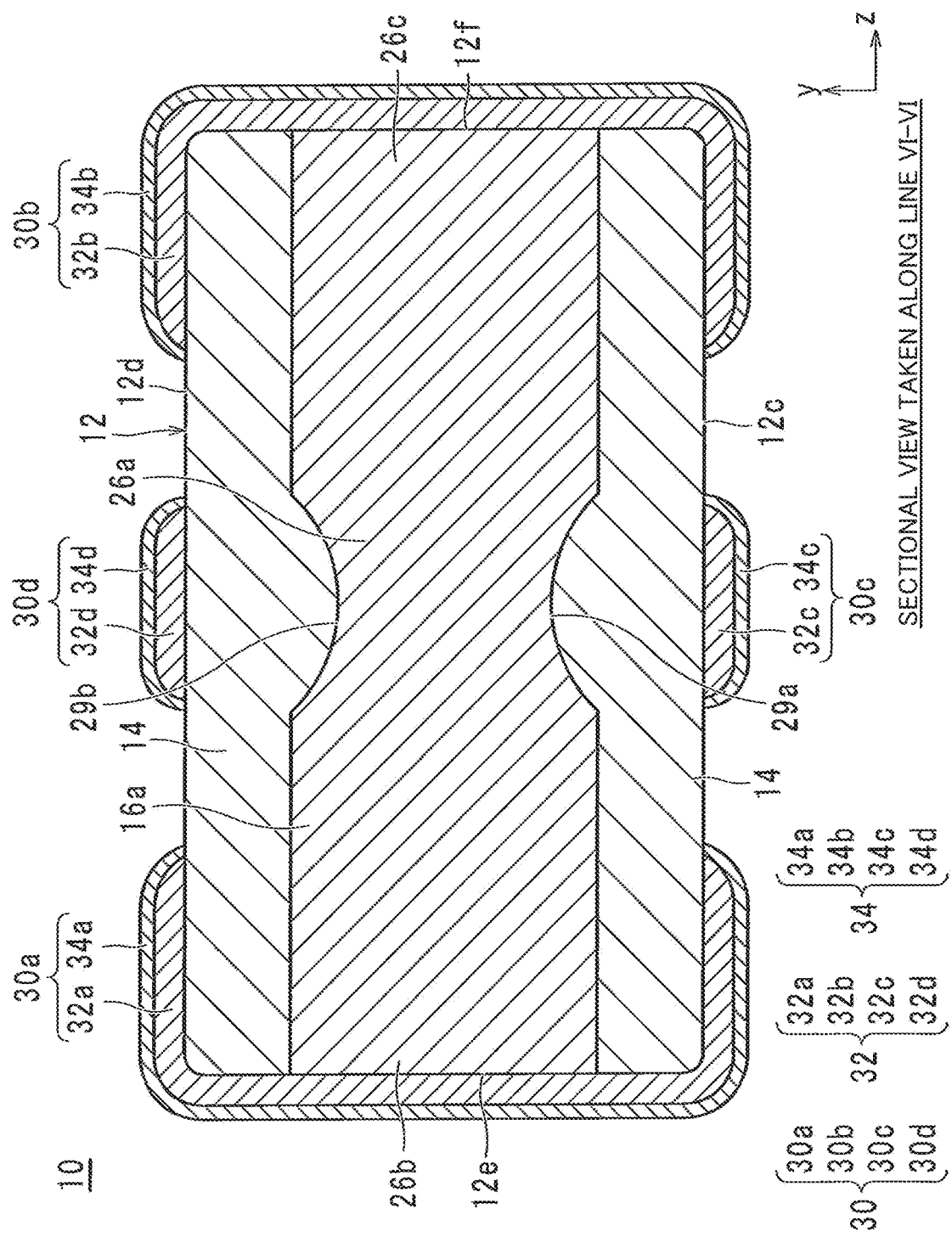
FIG. 6 is a sectional view taken along a line VI-VI in FIG. 4.
Figure 7:
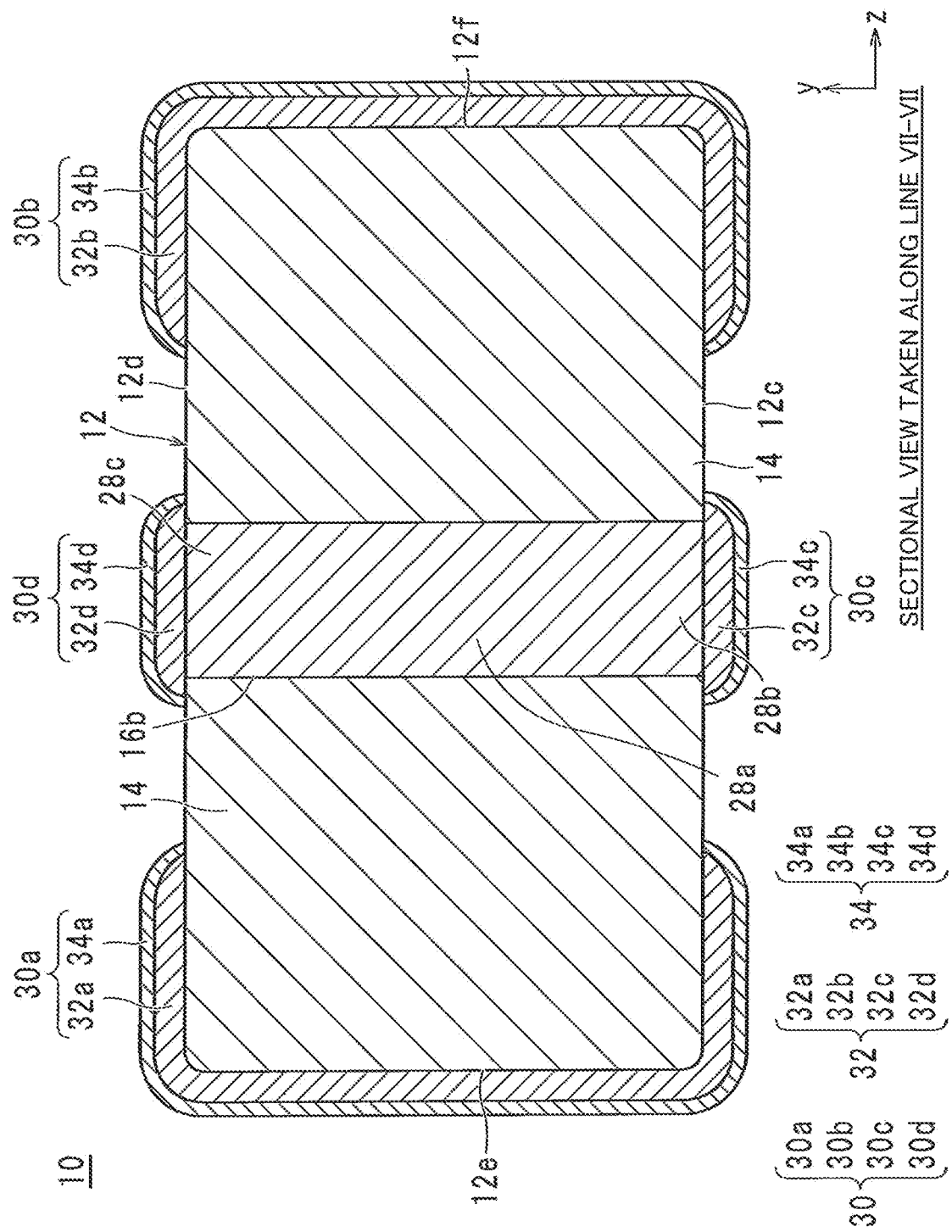
FIG. 7 is a sectional view taken along a line VII-VII in FIG. 4.

FIG. 1 is an external perspective view illustrating an example of a multilayer ceramic capacitor (three-terminal multilayer ceramic capacitor) according to a preferred embodiment of the present invention. FIG. 2A is a top view illustrating an example of the multilayer ceramic capacitor (three-terminal multilayer ceramic capacitor) according to the present preferred embodiment of the present invention, and FIG. 2B is a transmission view of each internal electrode layer as viewed from the top view in FIG. 2A. FIG. 3 is a side view illustrating an example of the multilayer ceramic capacitor (three-terminal multilayer ceramic capacitor) according to the present preferred embodiment of the present invention. FIG. 4 is a sectional view taken along a line IV-IV in FIG. 1. FIG. 5 is a sectional view taken along a line V-V in FIG. 1. FIG. 6 is a sectional view taken along a line VI-VI in FIG. 4. FIG. 7 is a sectional view taken along a line VII-VII in FIG. 4.

As illustrated in FIGS. 1 to 3, for example, a multilayer ceramic capacitor 10 includes a rectangular or substantially rectangular parallelepiped multilayer body 12 and an external electrode 30.

Multilayer body 12 includes a plurality of laminated dielectric layers 14 and a plurality of internal electrode layers laminated on dielectric layers 14. Furthermore, multilayer body 12 includes a first principal surface 12a and a second principal surface 12b that face each other in a height direction x, a first side surface 12c and a second side surface 12d that face each other in a width direction y orthogonal or substantially orthogonal to height direction x, and a first end surface 12e and a second end surface 12f that face each other in a length direction z orthogonal or substantially orthogonal to height direction x and width direction y.

An L dimension in length direction z of multilayer body 12 is not necessarily longer than a W dimension in width direction y.

External electrode 30 is disposed on a side of first end surface 12e and a side of second end surface 12f, and on a side of first side surface 12c and a side of second side surface 12d of multilayer body 12. External electrode 30 includes a first external electrode 30a, a second external electrode 30b, a third external electrode 30c, and a fourth external electrode 30d. Details of first external electrode 30a, second external electrode 30b, third external electrode 30c, and fourth external electrode 30d will be described later.

In multilayer body 12, a corner and a ridge are rounded. The corner is a portion where three adjacent surfaces of the multilayer body intersect with one another, and the ridge is a portion where two adjacent surfaces of the multilayer body intersect with each other. Irregularities or the like may be provided on a portion or all of first principal surface 12a and second principal surface 12b, first side surface 12c and second side surface 12d, and first end surface 12e and second end surface 12f.

Dimensions of multilayer body 12 is not particularly limited.

Multilayer body 12 includes an inner layer 18, and a first principal surface-side outer layer 20a and a second principal surface-side outer layer 20b sandwiching inner layer 18 therebetween in height direction x.

Inner layer 18 includes the plurality of dielectric layers 14 and the plurality of internal electrode layers 16. Inner layer 18 includes internal electrode layer 16 located closest to the side of first principal surface 12a to internal electrode layer 16 located closest to the side of second principal surface 12b in the height direction x.

First principal surface-side outer layer 20a is located on the side of first principal surface 12a. First principal surface-side outer layer 20a includes the plurality of dielectric layers 14 located between first principal surface 12a and internal electrode layer 16 closest to first principal surface 12a.

Second principal surface-side outer layer 20b is located on the side of second principal surface 12b. Second principal surface-side outer layer 20b includes the plurality of dielectric layers 14 located between second principal surface 12b and internal electrode layer 16 closest to second principal surface 12b.

Dielectric layer 14 used in first principal surface-side outer layer 20a and second principal surface-side outer layer 20b may be the same as dielectric layer 14 used in inner layer 18.

Multilayer body 12 includes a first side surface-side outer layer 22a that is located on the side of first side surface 12c and includes the plurality of dielectric layers 14 located between first side surface 12c and an outermost surface of inner layer 18 on the side of first side surface 12c.

Similarly, multilayer body 12 includes a second side surface-side outer layer 22b that is located on the side of second side surface 12d and includes the plurality of dielectric layers located between second side surface 12d and the outermost surface of inner layer 18 on the side of second side surface 12d.

FIG. 5 illustrates a range in width direction y of first side surface-side outer layer 22a and second side surface-side outer layer 22b. A width in width direction y of first side surface-side outer layer 22a and second side surface-side outer layer 22b is also referred to as a W gap or a side gap.

For example, dielectric layer 14 can be made of a dielectric material as a ceramic material. For example, a dielectric ceramic including a component such as $BaTiO_3$, $CaTiO_3$, $SrTiO_3$, or $CaZrO_3$ can be used as such a dielectric material. When the dielectric material is included as a main component, for example, a material to which an accessory component including a content smaller than that of the main component such as an Mn compound, an Fe compound, a Cr compound, a Co compound, or an Ni compound is added may be used depending on the desired characteristics of multilayer body 12.

Preferably, a thickness of dielectric layer 14 after baking is greater than or equal to about 30 μm and less than or equal to about 80 μm, for example.

The number of dielectric layers 14 to be laminated is preferably greater than or equal to 15 and less than or equal to 300, for example. The number of dielectric layers 14 is the total number of the number of dielectric layers 14 of inner layer 18 and the number of dielectric layers 14 of first principal surface-side outer layer 20a and second principal surface-side outer layer 20b.

Inner layer electrode 16 includes a plurality of first internal electrode layers 16a and a plurality of second internal electrode layers 16b as the plurality of internal electrode layers 16.

First internal electrode layer 16a is disposed on dielectric layer 14.

As illustrated in FIG. 6, first internal electrode layer 16a includes a first region 26a that extends between first end surface 12e and second end surface 12f of multilayer body 12 and corresponds to a central portion of an area between first end surface 12e and second end surface 12f, a second region 26b that extends from first region 26a to first end surface 12e of multilayer body 12, and a third region 26c that extends from first region 26a to second end surface 12f of multilayer body 12. First region 26a is located in the central portion on dielectric layer 14. Second region 26b is exposed to first end surface 12e of multilayer body 12, and third region 26c is exposed to second end surface 12f of multilayer body 12. Accordingly, first internal electrode layer 16a is not exposed to first side surface 12c and second side surface 12d of multilayer body 12.

A shape of first internal electrode layer 16a is not particularly limited, but is preferably a rectangular or a substantially rectangular shape. However, a corner may be rounded.

In first internal electrode layer 16a, when the multilayer ceramic capacitor 10 is viewed from height direction x, as illustrated in FIG. 2B, a recess 29a is provided so as not to overlap a portion of first principal surface 12a and third external electrode 30c disposed on a portion of second principal surface 12b, and a recess 29b is provided so as not to overlap a portion of first principal surface 12a and fourth external electrode 30d disposed on a portion of second principal surface 12b.

More specifically, in first region 26a of first internal electrode layer 16a, the side of first side surface 12c includes recess 29a that becomes a region where internal electrode layer 16 is not provided, and the side of second side surface 12d includes recess 29b that becomes a region where internal electrode layer 16 is not provided.

Thus, even when a high electric field is applied to multilayer ceramic capacitor 10, a dielectric breakdown can be reduced or prevented between first internal electrode layer 16a and third external electrode 30c and fourth external electrode 30d that are connected to second internal electrode layer 16b.

The shape of recess 29a is not particularly limited as long as recess 29a does not overlap third external electrode 30c disposed on a portion of first principal surface 12a and second principal surface 12b when multilayer ceramic capacitor 10 is viewed from height direction x.

Similarly, the shape of recess 29b is not particularly limited as long as recess 29b does not overlap fourth external electrode 30d disposed on a portion of first principal surface 12a and second principal surface 12b when multilayer ceramic capacitor 10 is viewed from height direction x.

In the present preferred embodiment, recess 29a and recess 29b have semicircular shapes.

Second internal electrode layer 16b is disposed on dielectric layer 14 different from dielectric layer 14 on which first internal electrode layer 16a is disposed.

As illustrated in FIG. 7, second internal electrode layer 16b includes a fourth region 28a that extends between first side surface 12c and second side surface 12d of multilayer body 12 and corresponds to the central portion of an area between first side surface 12c and second side surface 12d, a fifth region 28b that extends from fourth region 28a and to the first side surface 12c, and a sixth region 28c that extends from fourth region 28a and to second side surface 12d. Fourth region 28a is located in the central portion on dielectric layer 14. Fifth region 28b is exposed to first side surface 12c of multilayer body 12, and sixth region 28c is exposed to second side surface 12d of multilayer body 12. Accordingly, second internal electrode layer 16b is not exposed to first end surface 12e and second end surface 12f of multilayer body 12.

The shape of fourth region 28a of second internal electrode layer 16b and the shapes of fifth region 28b and sixth region 28c are not particularly limited, but are preferably rectangular or substantially rectangular. However, the corners of the respective regions may be rounded.

Second internal electrode layer 16b is disposed at least between first internal electrode layer 16a located closest to the side of first principal surface 12a and first principal surface 12a, and at least between first internal electrode layer 16a located closest to the side of second principal surface 12b and second principal surface 12b.

Thus, a current path to the mounting substrate can be shortened, a low equivalent series resistance (ESL) effect can be obtained, and even when the high electric field is applied to multilayer ceramic capacitor 10, the dielectric breakdown can be reduced or prevented between first internal electrode layer 16a and third external electrode 30c and fourth external electrode 30d that are connected to second internal electrode layer 16b. As a result, the dielectric breakdown voltage (BDV) of multilayer ceramic capacitor 10 can be improved.

The length in length direction z of second internal electrode layer 16b is smaller than the maximum length in length direction z of third external electrode 30c disposed on a portion of first principal surface 12a and a portion of second principal surface 12b and fourth external electrode 30d disposed on a portion of first principal surface 12a and a portion of second principal surface 12b.

Thus, the capacitance can be further reduced while the DC resistance is reduced.

In second internal electrode layer 16b, fourth region 28a of second internal electrode layer 16b does not extend in the direction of first end surface 12e and the direction of second end surface 12f, and the width in length direction z connecting first end surface 12e and second end surface 12f in fourth region 28a of second internal electrode layer 16b is preferably the same or substantially the same as the width in length direction z connecting first end surface 12e and second end surface 12f in fifth region 28b and sixth region 28c of second internal electrode layer 16b.

Thus, by adjusting only an area of second internal electrode layer 16b without changing an area of first internal electrode layer 16a, the capacitance of multilayer ceramic capacitor 10 can be reduced while the DC resistance is reduced.

First region 26a of first internal electrode layer 16a and fourth region 28a of second internal electrode layer 16b face each other.

The number of first internal electrode layers 16a is larger than the number of second internal electrode layers 16b, and at least two of first internal electrode layers 16a are continuously laminated. Thus, in multilayer ceramic capacitor 10 of FIG. 1, while an increase in capacitance is reduced or prevented, not only the number of first internal electrode layers 16a is increased to increase the number of first internal electrode layers 16a connected in parallel, but also the conductivity between first internal electrode layers 16a and external electrodes 30 is improved, so that the increase in direct current resistance can be reduced or prevented.

Inner layer 18 of multilayer body 12 includes a capacitance generator 19 in which first internal electrode layer 16a and second internal electrode layer 16b face each other with dielectric layer 14 interposed therebetween to generate the capacitance, and an internal electrode multilayer unit 24 that is a region where at least two first internal electrode layers 16a are continuously laminated. In multilayer ceramic capacitor 10, a capacitor characteristic is provided by the capacitance generator 19.

Figure 8:
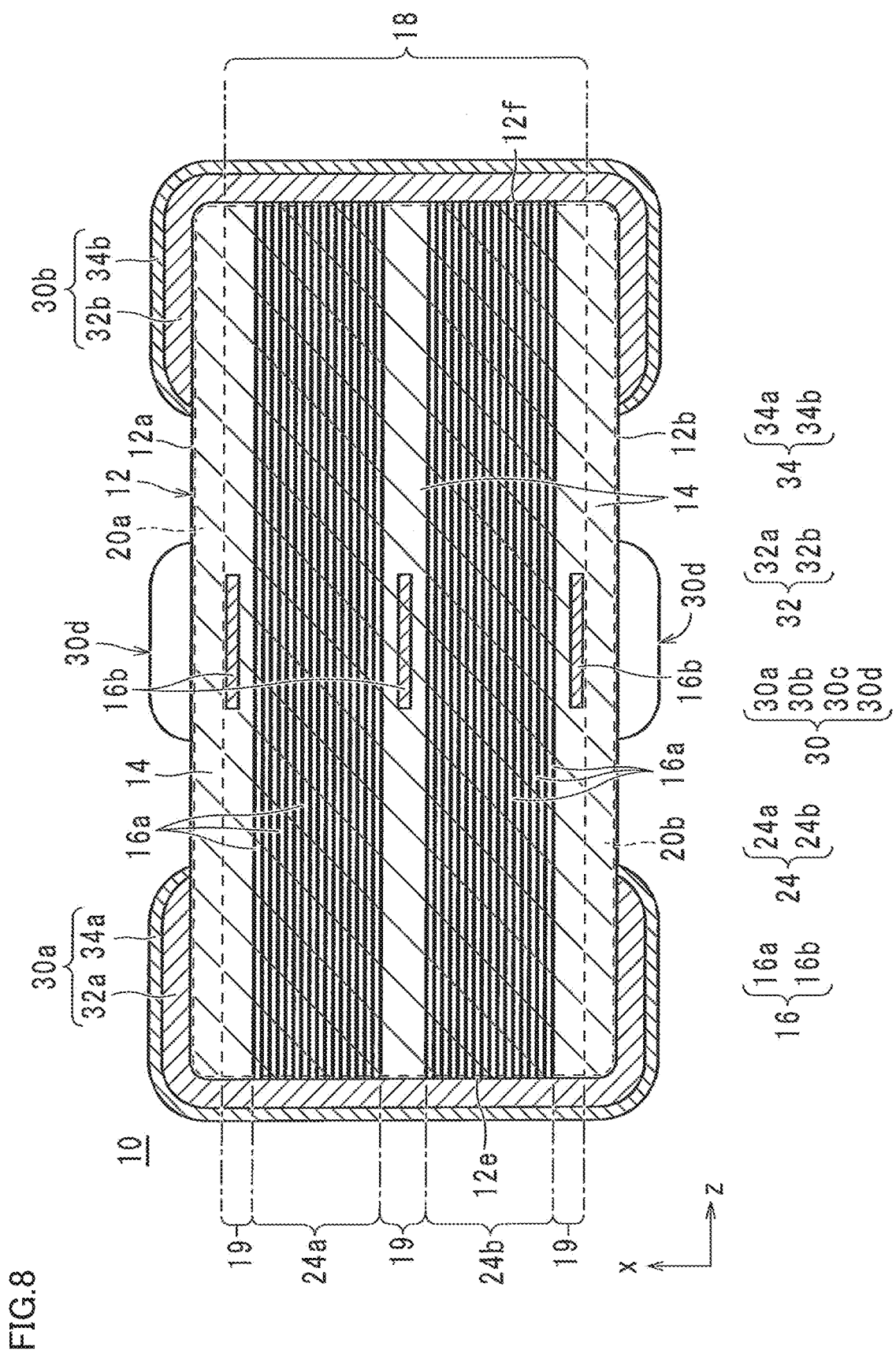
FIG. 8 is a sectional view corresponding to FIG. 4, and illustrating a modification of the multilayer ceramic capacitor in FIG. 1.
Figure 9:
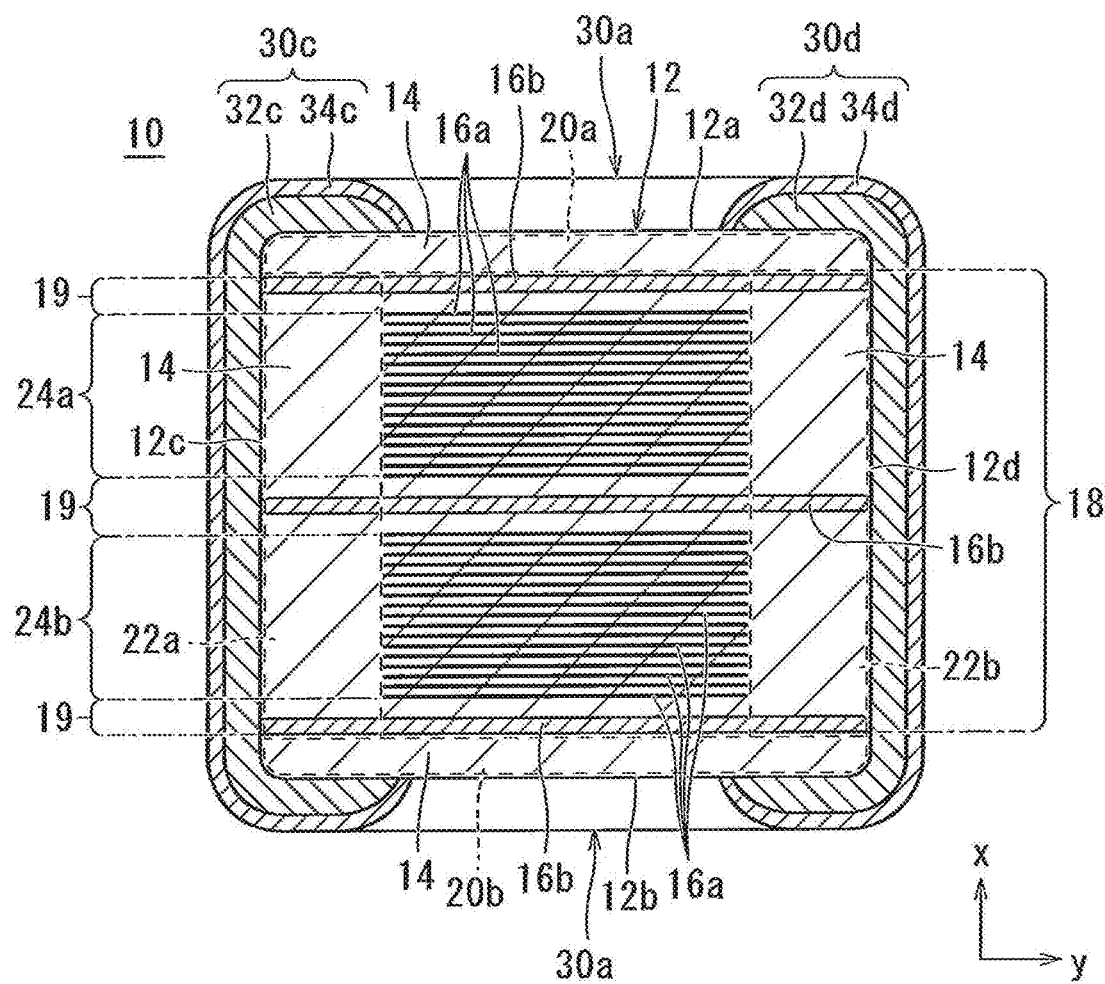
FIG. 9 is a sectional view corresponding to FIG. 5, and illustrating a modification of the multilayer ceramic capacitor in FIG. 1.

In multilayer ceramic capacitor 10 of FIG. 1, as illustrated in FIGS. 8 and 9, second internal electrode layer 16b may be disposed so as to divide internal electrode multilayer unit 24 that is the region where at least two first internal electrode layers 16a are continuously laminated. At this point, internal electrode multilayer unit 24 is divided into a first internal electrode multilayer unit 24a and a second internal electrode multilayer unit 24b by one second internal electrode layer 16b.

Thus, because the aggregate of first internal electrode layers 16a is dispersed, a heat dissipation effect is improved, and a temperature rise reduction or prevention effect can be obtained.

Furthermore, single second internal electrode layer 16b may be disposed so as to divide internal electrode multilayer unit 24, which is the region where at least two first internal electrode layers 16a are continuously laminated, into a plurality of portions. Thus, more first internal electrode layers 16a can be laminated, and the advantageous effect of reducing the DC resistance can be obtained.

On the other hand, at least two second internal electrode layers 16b may be laminated and disposed so as to divide internal electrode multilayer unit 24, which is the region where at least two first internal electrode layers 16a are continuously laminated, into the plurality of portions. Thus, the connectivity of third external electrode 30c provided on first side surface 12c and fourth external electrode 30d provided on second side surface 12d can be made more sufficient even when the number of second internal electrode layers 16b is reduced.

The thickness of dielectric layer 14 located between first internal electrode layer 16a and second internal electrode layer 16b is preferably greater than or equal to about 30 μm, for example. Thus, the advantageous effect is provided in the region where preferred embodiments of the present invention are made more conspicuous.

The thickness of dielectric layer 14 located between first internal electrode layer 16a and second internal electrode layer 16b is preferably greater than the thickness of dielectric layer 14 located between first internal electrode layers 16a. Thus, more first internal electrode layers 16a can be laminated, and the advantageous effect of reducing the DC resistance can be further increased.

When multilayer ceramic capacitor 10 is viewed from height direction x, the distance on the same plane between the sides at the end of third external electrode 30c disposed on a portion of first principal surface 12a and a portion of second principal surface 12b and the end of fourth external electrode 30d disposed on a portion of first principal surface 12a and a portion of second principal surface 12b and the side at the end of recess 29a of first internal electrode layer 16a, and the distance on the same plane between the sides of at the end of third external electrode 30c disposed on a portion of first principal surface 12a and a portion of second principal surface 12b and the end of fourth external electrode 30d disposed on a portion of first principal surface 12a and a portion of second principal surface 12b and the side at the end of recess 29b of first internal electrode layer 16a is preferably greater than or equal to about 100 μm, for example, at the shortest.

Thus, even when the high electric field is applied, the dielectric breakdown can be more markedly reduced or prevented between third external electrode 30c and fourth external electrode 30d that are connected to second internal electrode layer 16b and first internal electrode layer 16a.

In first internal electrode layer 16a, the shortest distance in width direction y between recess 29a and recess 29b is shorter than the shortest distance in width direction y of first internal electrode layer 16a in a portion where recess 29a and recess 29b are not provided.

Thus, even when the high electric field is applied, the dielectric breakdown can be more markedly reduced or prevented between third external electrode 30c and fourth external electrode 30d that are connected to second internal electrode layer 16b and first internal electrode layer 16a.

The numbers of first internal electrode layers 16a and second internal electrode layers 16b are preferably, for example, greater than or equal to 15 and less than or equal to 200 in total.

The number of first internal electrode layers 16a is not particularly limited, but is preferably, for example, greater than or equal to 50 and less than or equal to 100.

The number of second internal electrode layers 16b is less than the number of first internal electrode layers 16a. Specifically, the number of second internal electrode layers 16b is not particularly limited, but is preferably, for example, greater than or equal to 1 and less than or equal to 20.

The thicknesses of first internal electrode layer 16a and second internal electrode layer 16b are not particularly limited, but are preferably, for example, greater than or equal to about 0.5 μm and less than or equal to about 2.0 μm.

The thickness of fourth region 28a of second internal electrode layer 16b is not particularly limited, but is preferably, for example, greater than or equal to about 30 μm and less than or equal to about 80 μm.

First internal electrode layer 16a and second internal electrode layer 16b can be made of an appropriate conductive material such as, for example, a metal such as Ni, Cu, Ag, Pd, or Au, or an alloy, such as an Ag—Pd alloy, including at least one of these metals.

External electrode 30 is disposed on the side of first end surface 12e and the side of second end surface 12f, and the side of first side surface 12c and the side of second side surface 12d of multilayer body 12. External electrode 30 includes a first external electrode 30a, a second external electrode 30b, a third external electrode 30c, and a fourth external electrode 30d.

First external electrode 30a is disposed on first end surface 12e of multilayer body 12. First external electrode 30a extends from first end surface 12e of multilayer body 12 and covers a portion of each of first principal surface 12a, second principal surface 12b, first side surface 12c, and second side surface 12d. In addition, first external electrode 30a is electrically connected to second region 26b of first internal electrode layer 16a exposed to first end surface 12e of multilayer body 12. First external electrode 30a may be disposed only on first end surface 12e of multilayer body 12.

Second external electrode 30b is disposed on second end surface 12f of multilayer body 12. Second external electrode 30b extends from second end surface 12f of multilayer body 12 and covers a portion of each of first principal surface 12a, second principal surface 12b, first side surface 12c, and second side surface 12d. Second external electrode 30b is electrically connected to third region 26c of first internal electrode layer 16a exposed at second end surface 12f of multilayer body 12. Second external electrode 30b may be disposed only on second end surface 12f of multilayer body 12.

Third external electrode 30c is disposed on first side surface 12c of multilayer body 12. Third external electrode 30c extends from first side surface 12c and covers a portion of first principal surface 12a and second principal surface 12b. Third external electrode 30c is electrically connected to fifth region 28b of second internal electrode layer 16b exposed on first side surface 12c of multilayer body 12.

Fourth external electrode 30d is disposed on second side surface 12d of multilayer body 12. Fourth external electrode 30d extends from second side surface 12d and covers a portion of first principal surface 12a and second principal surface 12b. Fourth external electrode 30d is electrically connected to sixth region 28c of second internal electrode layer 16b exposed on second side surface 12d of multilayer body 12.

External electrode 30 includes a ground electrode layer 32 disposed on the surface of multilayer body 12 and a plating layer 34 covering ground electrode layer 32.

Ground electrode layer 32 includes a first ground electrode layer 32a, a second ground electrode layer 32b, a third ground electrode layer 32c, and a fourth ground electrode layer 32d.

First ground electrode layer 32a is disposed on the surface of first end surface 12e of multilayer body 12, and extends from first end surface 12e and covers a portion of each of first principal surface 12a, second principal surface 12b, first side surface 12c, and second side surface 12d.

Second ground electrode layer 32b is disposed on the surface of second end surface 12f of multilayer body 12, and extends from second end surface 12f and covers a portion of each of first principal surface 12a, second principal surface 12b, first side surface 12c, and second side surface 12d.

First ground electrode layer 32a may be disposed only on the surface of first end surface 12e of multilayer body 12, and second ground electrode layer 32b may be disposed only on the surface of second end surface 12f of multilayer body 12.

Third ground electrode layer 32c is disposed on the surface of first side surface 12c of multilayer body 12, and extends from first side surface 12c and covers a portion of each of first principal surface 12a and second principal surface 12b.

Fourth ground electrode layer 32d is disposed on the surface of second side surface 12d of multilayer body 12, and extends from second side surface 12d and covers a portion of each of first principal surface 12a and second principal surface 12b.

Ground electrode layer 32 includes at least one selected from a baked layer, a conductive resin layer, a thin film layer, and the like, for example.

Each configuration in the case where ground electrode layer 32 is the baked layer, the conductive resin layer, or the thin film layer will be described below.

Case of Baked Layer

The baked layer includes a glass component and a metal component. The glass component of the baked layer includes, for example, at least one selected from B, Si, Ba, Mg, Al, Li, and the like. For example, the metal component of the baked layer includes at least one selected from Cu, Ni, Ag, Pd, an Ag—Pd alloy, Au, and the like. The baked layer may include a plurality of layers. The baked layer is obtained by applying a conductive paste including the glass component and the metal component to multilayer body 12. The baked layer may be formed by simultaneously baking a multilayer chip including internal electrode layers 16 and dielectric layers 14 and a conductive paste applied to the multilayer chip, or formed by baking a multilayer chip including internal electrode layers 16 and dielectric layers 14 to obtain multilayer body 12 and then applying a conductive paste to multilayer body 12 and baking the conductive paste. When the multilayer chip including internal electrode layer 16 and dielectric layer 14 as the baked layer and the conductive paste applied to the multilayer chip are simultaneously fired, preferably the baked layer to which a dielectric material is added instead of a glass component is baked to form the baked layer.

The thickness in the direction connecting first end surface 12e and second end surface 12f at the central portion in height direction x of first ground electrode layer 32a located at first end surface 12e is preferably greater than or equal to about 3 µm and less than or equal to about 70 µm, for example.

In addition, the thickness in the direction connecting first end surface 12e and second end surface 12f at the central portion in height direction x of second ground electrode layer 32b located on second end surface 12f is preferably greater than or equal to about 3 µm and less than or equal to about 70 µm, for example.

When first ground electrode layer 32a is provided on a portion of first principal surface 12a and a portion of the second principal surface 12b and a portion of first side surface 12c and a portion of second side surface 12d, the thickness in the height direction connecting first principal surface 12a and second principal surface 12b at the central portion in length direction z, which is first ground electrode layer 32a located on first principal surface 12a and second principal surface 12b and first side surface 12c and second side surface 12d, is preferably, for example, greater than or equal to about 3 µm and less than or equal to about 40 µm, for example.

When second ground electrode layer 32b is provided on a portion of first principal surface 12a and a portion of second principal surface 12b and a portion of first side surface 12c and a portion of second side surface 12d, the thickness in the height direction connecting first principal surface 12a and second principal surface 12b at the central portion in length direction z, which is second ground electrode layer 32b located on first principal surface 12a and second principal surface 12b and first side surface 12c and second side surface 12d, is preferably, for example, greater than or equal to about 3 µm and less than or equal to about 40 µm, for example.

The thickness in the direction connecting first side surface 12c and second side surface 12d at the central portion in height direction x of third ground electrode layer 32c located on first side surface 12c is preferably greater than or equal to about 3 µm and less than or equal to about 70 µm, for example.

In addition, the thickness in the direction connecting first side surface 12c and second side surface 12d at the central portion in height direction x of fourth ground electrode layer 32d located on second side surface 12d is preferably greater than or equal to about 3 µm and less than or equal to about 70 µm, for example.

Case of Conductive Resin Layer

The conductive resin layer include a plurality of layers.

The conductive resin layer may be disposed on the baked layer so as to cover the baked layer, or directly disposed on multilayer body 12.

The conductive resin layer includes a thermosetting resin and metal.

The conductive resin layer may completely cover ground electrode layer 32, or cover a portion of ground electrode layer 32.

Because the conductive resin layer includes the thermosetting resin, the conductive resin layer is more flexible than a conductive layer made of, for example, a plated film or a fired product of a conductive paste. For this reason, even when impact caused by a physical impact or a thermal cycle is applied to multilayer ceramic capacitor 10, the conductive resin layer can define and function as a buffer layer to prevent the crack in multilayer ceramic capacitor 10.

For example, Ag, Cu, Ni, Sn, Bi, or an alloy including them can be used as the metal contained in the conductive resin layer.

In addition, metal powder in which the surface of the metal powder is coated with Ag, for example, can also be used. When an Ag-coated metal powder is used, for example, Cu, Ni, Sn, Bi, or an alloy powder thereof is preferably used as the metal powder. The reason for using the conductive metal powder of Ag as the conductive metal is that Ag has the lowest specific resistance among metals and thus is suitable as an electrode material, and that Ag is not oxidized and has high weather resistance because Ag is a noble metal. In addition, this is because the metal of the base material can be made inexpensive while the characteristic of Ag is maintained.

Furthermore, the metal obtained by subjecting Cu, Ni to oxidation preventing treatment can also be used as the metal contained in the conductive resin layer.

The metal powder obtained by coating the surface of the metal powder with, for example, Sn, Ni, Cu can also be used as the metal included in the conductive resin layer. When the metal powder coated with Sn, Ni, Cu is used, for example, Ag, Cu, Ni, Sn, Bi, or an alloy powder thereof is preferably used as the metal powder.

When conductive fillers come into contact with each other, an energization path is provided inside the conductive resin layer.

As the metal included in the conductive resin layer, a spherical metal powder or a flat metal powder can be used, but a mixture of the spherical metal powder and the flat metal powder is preferably used.

For example, known various thermosetting resins such as an epoxy resin, a phenol resin, a urethane resin, a silicone resin, and a polyimide resin can be used as the resin for the conductive resin layer. Among others, the epoxy resin having excellent heat resistance, moisture resistance, adhesion, and the like is one of the most suitable resins.

The conductive resin layer preferably includes a curing agent together with the thermosetting resin. When the epoxy resin is used as the base resin, various known compounds such as, for example, phenol-based, amine-based, acid anhydride-based, imidazole-based, active ester-based, and amide-imide-based compounds can be used as the curing agent of the epoxy resin.

The thickness of the conductive resin layer located at the central portion in height direction x of multilayer body 12 located at first end surface 12e and second end surface 12f is preferably, for example, greater than or equal to about 10 µm and less than or equal to about 150 µm, for example.

Case of Thin Film Layer

When the thin film layer is provided as ground electrode layer 32, the thin film layer is formed by a thin film forming method such as a sputtering method or a vapor deposition method, for example, and is a layer having the thickness of, for example, less than or equal to about 1 µm on which metal particles are deposited.

Plating layer 34 includes a first plating layer 34a, a second plating layer 34b, a third plating layer 34c, and a fourth plating layer 34d.

For example, first plating layer 34a, second plating layer 34b, third plating layer 34c, and fourth plating layer 34d include at least one selected from Cu, Ni, Sn, Ag, Pd, an Ag—Pd alloy, Au, and the like.

First plating layer 34a covers first ground electrode layer 32a.

Second plating layer 34b covers second ground electrode layer 32b.

Third plating layer 34c covers third ground electrode layer 32c.

Fourth plating layer 34d covers fourth ground electrode layer 32d.

Plating layer 34 may include a plurality of layers. In this case, plating layer 34 preferably has a two-layer structure including a lower plating layer provided by Ni plating on ground electrode layer 32 and an upper plating layer provided by Sn plating on the lower plating layer.

That is, first plating layer 34a includes a first lower plating layer and a first upper plating layer located on the surface of the first lower plating layer.

Second plating layer 34b includes a second lower plating layer and a second upper plating layer located on the surface of the second lower plating layer.

Third plating layer 34c includes a third lower plating layer and the second upper plating layer located on the surface of the third lower plating layer.

Fourth plating layer 34d includes a fourth lower plating layer and the second upper plating layer located on the surface of the fourth lower plating layer.

The lower plating layer defined by the Ni plating is used to prevent ground electrode layer 32 from being eroded by solder in mounting multilayer ceramic capacitor 10, and the upper plating layer defined by the Sn plating is used such that wettability of the solder can be improved to easily mount multilayer ceramic capacitor 10.

The thickness per plating layer is preferably greater than or equal to about 2.0 µm and less than or equal to about 15.0 µm, for example.

External electrode 30 may include only the plating layer without providing ground electrode layer 32.

Although not illustrated, a structure in which the plating layer is provided without providing ground electrode layer 32 will be described below.

In any or each of first external electrode 30a to fourth external electrode 30d, the plating layer may be provided directly on the surface of multilayer body 12 without providing ground electrode layer 32. That is, multilayer ceramic capacitor 10 may have a structure including first internal electrode layer 16a and the plating layer electrically connected to second internal electrode layer 16b. In such a case, the plating layer may be provided after a catalyst is disposed on the surface of multilayer body 12 as pretreatment.

When the plating layer is directly provided on multilayer body 12 without providing ground electrode layer 32, ground electrode layer 32 can be reduced in height, namely, reduced in thickness, or converted into the thickness of multilayer body 12, namely, the thickness of inner layer 18, so that the degree of freedom in designing the thin chip can be improved.

The plating layer preferably includes a lower plating electrode provided on the surface of multilayer body 12 and an upper plating electrode provided on the surface of the lower plating electrode. For example, each of the lower plating electrode and the upper plating electrode preferably includes at least one metal selected from Cu, Ni, Sn, Pb, Au, Ag, Pd, Bi, Zn, or the like, or an alloy including the metal.

Furthermore, for example, the lower plating electrode is preferably made of Ni having solder barrier performance, and the upper plating electrode is preferably made of Sn or Au having good solder wettability.

For example, when first internal electrode layer 16a and second internal electrode layer 16b are made of Ni, the lower plating electrode is preferably made of Cu having good bondability with Ni. The upper plating electrode may be provided as necessary, and each of first external electrode 30a to fourth external electrode 30d may include only the lower plating electrode. As the plating layer, the upper plating electrode may be an outermost layer, or another plating electrode may be provided on the surface of the upper plating electrode.

At this point, when external electrode 30 includes only the plating layer without providing ground electrode layer 32, the thickness per layer of the plating layer disposed without providing ground electrode layer 32 is preferably greater than or equal to about 1 µm and less than or equal to about 15 µm, for example.

Furthermore, the plating layer preferably does not include glass. The metal ratio per unit volume of the plating layer is preferably greater than or equal to about 99 vol %, for example.

The dimension in length direction z of multilayer ceramic capacitor 10 including multilayer body 12 and first external electrode 30a to fourth external electrode 30d is defined as an L dimension, the dimension in height direction x of multilayer ceramic capacitor 10 including multilayer body 12 and first external electrode 30a to fourth external electrode 30d is defined as a T dimension, and the dimension in width direction y of multilayer ceramic capacitor 10 including multilayer body 12 and first external electrode 30a to fourth external electrode 30d is defined as a W dimension.

The dimensions of multilayer ceramic capacitor 10 are not particularly limited, but, for example, the L dimension in length direction z is greater than or equal to about 1.0 mm and less than or equal to about 3.2 mm, the W dimension in width direction y is greater than or equal to about 0.5 mm and less than or equal to about 2.5 mm, and the T dimension in the height direction x is greater than or equal to about 0.3 mm and less than or equal to about 2.5 mm. The dimensions of multilayer ceramic capacitor 10 can be measured with a microscope.

According to multilayer ceramic capacitor 10 in FIG. 1, by including the above configuration, even when a high electric field is applied to multilayer ceramic capacitor 10, the dielectric breakdown can be reduced or prevented between first internal electrode layer 16a and third external electrode 30c and fourth external electrode 30d that are connected to second internal electrode layer 16b. As a result, the dielectric breakdown voltage (BDV) of multilayer ceramic capacitor 10 can be improved.

2. Method for Manufacturing Multilayer Ceramic Capacitor

A non-limiting example of a method for manufacturing the multilayer ceramic capacitor of the present invention will be described below.

First, a dielectric sheet for the dielectric layer and a conductive paste for the internal electrode are prepared. The dielectric sheet and the conductive paste for the internal electrode layer include a binder and a solvent. The binder and the solvent may be known ones.

The conductive paste for the internal electrode layer is printed on the dielectric sheet with a predetermined pattern by, for example, screen printing or gravure printing. Thus, the dielectric sheet on which the pattern of the first internal electrode layer is formed and the dielectric sheet on which the pattern of the second internal electrode layer is formed are prepared.

More specifically, for example, a screen printing plate used to print the first internal electrode layer and a screen printing plate used to print the second internal electrode layer are separately prepared, and a printing machine capable of separately printing the two types of screen printing plates can be used to print a pattern of each internal electrode layer.

At this point, a portion that becomes inner layer 18 is formed by laminating sheets on which the first internal electrode layer and the second internal electrode layer are printed so as to obtain a desired structure. At this time, the number of sheets on which the first internal electrode layer is printed is larger than the number of sheets on which the second internal electrode layer is printed, and at least two sheets on which the first internal electrode layer is printed are continuously laminated.

Subsequently, a portion that becomes second principal surface-side outer layer 20b on the second principal surface side is formed by laminating a predetermined number of dielectric sheets on which the pattern of the internal electrode layer is not printed. Then, the portion that becomes inner layer 18 formed by the above-described process is laminated on the portion that becomes second principal surface-side outer layer 20b, and a predetermined number of dielectric sheets on which the pattern of the internal electrode layer is not printed is laminated on the portion that becomes inner layer 18, thereby forming the portion that becomes first principal surface-side outer layer 20a on the first principal surface side. Thus, a multilayer sheet is prepared.

Subsequently, the multilayer sheet is pressed in the laminating direction by, for example, isostatic pressing to prepare a multilayer block.

Subsequently, the multilayer block is cut into a predetermined size to cut out a multilayer chip. At this point, the corner and the ridge of the multilayer chip may be rounded by barrel polishing or the like.

The cut multilayer chip is baked to produce multilayer body 12. The baking temperature depends on the material of dielectric layer 14 or internal electrode layer 16, but is preferably greater than or equal to about 900° C. and less than or equal to about 1400° C., for example.

Ground Electrode Layer

Subsequently, third ground electrode layer 32c of third external electrode 30c is formed on first side surface 12c of multilayer body 12 obtained by baking, and fourth ground electrode layer 32d of fourth external electrode 30d is formed on second side surface 12d of multilayer body 12.

When the baked layer is formed as ground electrode layer 32, the conductive paste including a glass component and a metal component is applied, and then a baking processing is performed to form the baked layer as ground electrode layer 32. The temperature of the baking treatment at this time is preferably greater than or equal to about 700° C. and less than or equal to about 900° C., for example.

At this point, various methods can be used as the method for forming the baked layer. For example, a method in which the conductive paste is extruded from a slit and applied can be used. In this method, ground electrode layer 32 can be formed not only on first side surface 12c and second side surface 12d but also on a portion of first principal surface 12a and a portion of second principal surface 12b by increasing an extrusion amount of the conductive paste.

Further, ground electrode layer 32 can also be formed using a roller transfer method. In the case of the roller transfer method, when ground electrode layer 32 is formed not only on first side surface 12c and second side surface 12d, but also on a portion of first principal surface 12a and a portion of second principal surface 12b, ground electrode layer 32 can be formed on a portion of first principal surface 12a and a portion of second principal surface 12b by increasing the pressing pressure at the time of roller transfer.

Subsequently, first ground electrode layer 32a of first external electrode 30a is formed on first end surface 12e of multilayer body 12 obtained by baking, and second ground electrode layer 32b of second external electrode 30b is formed on second end surface 12f of multilayer body 12.

Similarly to the formation of each base electrode layers 32 of third external electrode 30c and fourth external electrode 30d, when the baked layer is formed as ground electrode layer 32, the conductive paste including the glass component and the metal component is applied, and then the baking treatment is performed to form the baked layer as ground electrode layer 32. The temperature of the baking treatment at this time is preferably greater than or equal to about 700° C. and less than or equal to about 900° C., for example.

Furthermore, as the method for forming the baked layer as ground electrode layer 32 of first external electrode 30a and second external electrode 30b, the baked layer can be formed by a method for extruding and applying the conductive paste from the slit or the roller transfer method.

Regarding the baking treatment, third ground electrode layer 32c of third external electrode 30c, fourth ground electrode layer 32d of fourth external electrode 30d, first ground electrode layer 32a of first external electrode 30a, and second ground electrode layer 32b of second external electrode 30b may be simultaneously baked, or third ground electrode layer 32c of third external electrode 30c and fourth ground electrode layer 32d of fourth external electrode 30d and first ground electrode layer 32a of first external electrode 30a and second ground electrode layer 32b of second external electrode 30b may be separately baked.

Conductive Resin Layer

When ground electrode layer 32 is formed of the conductive resin layer, the conductive resin layer can be formed by the following method, for example. The conductive resin layer may be formed on the surface of the baked layer, or the conductive resin layer may be directly formed alone on multilayer body 12 without forming the baked layer.

As the method for forming the conductive resin layer, a conductive resin paste including a thermosetting resin and a metal component is applied onto the baked layer or multilayer body 12, and heat treatment is performed at a temperature, for example, greater than or equal to about 250° C. and less than or equal to about 550° C. to thermally cure the resin, thereby forming the conductive resin layer. An atmosphere during the heat treatment at this time is preferably an N2 atmosphere, for example. In addition, in order to prevent scattering of the resin and to prevent oxidation of various metal components, an oxygen concentration is preferably less than or equal to about 100 ppm, for example.

As the method for applying the conductive resin paste, similar to the method for forming ground electrode layer 32 as the baked layer, the conductive resin paste can be formed by, for example, a method in which the conductive resin paste is extruded from the slit and applied or the roller transfer method.

Thin Film Layer

When ground electrode layer 32 is formed as the thin film layer, masking or the like is performed, for example, and the base electrode layer can be formed in the portion where external electrode 30 is to be formed by a thin film forming method such as a sputtering method or a vapor deposition method. The ground electrode layer formed of the thin film layer is a layer having a thickness of, for example, less than or equal to about 1 μm on which metal particles are deposited.

Plating Electrode

A plating electrode may be provided in second region 26a, third region 26b, fifth region 28b, and sixth region 28c where internal electrode layer 16 of multilayer body 12 is exposed without providing ground electrode layer 32. In this case, it can be formed by the following method, for example.

The plating processing is performed on first end surface 12e and second end surface 12f of multilayer body 12 to form the lower plating electrode on second region 26b and third region 26c, which are the exposed portion of first internal electrode layer 16a. Similarly, the plating processing is performed on first side surface 12c and second side surface 12d of multilayer body 12 to form the lower plating electrode on fifth region 28b and sixth region 28c, which are the exposed portion of second internal electrode layer 16b. In performing the plating processing, either electrolytic plating or electroless plating may be adopted, but the electroless plating requires the pretreatment with a catalyst or the like in order to improve a plating deposition rate, and has a disadvantage that the process becomes complicated. Accordingly, it is usually preferable to use the electrolytic plating. Barrel plating is preferably used as the plating method. As required, the upper plating electrode formed on the surface of the lower plating electrode may be formed similarly.

Subsequently, plating layer 34 is formed on the surface of ground electrode layer 32, the surface of the conductive resin layer, the surface of the lower plating electrode, and the surface of the upper plating electrode as necessary.

More specifically, in the present preferred embodiment, a Ni plating layer is formed as the lower plating layer on ground electrode layer 32 that is the baked layer, and a Sn plating layer is formed as the upper plating layer. For example, the Ni plating layer and the Sn plating layer are sequentially formed by a barrel plating method. In performing the plating processing, either electrolytic plating or electroless plating may be used. However, the electroless plating requires preprocessing using a catalyst or the like in order to improve the plating deposition rate, and has a disadvantage that the process becomes complicated. Therefore, usually the electrolytic plating is preferably used.

As described above, multilayer ceramic capacitor 10 of the present preferred embodiment is manufactured.

3. Experimental Example

Then, in order to check the advantageous effects of the multilayer ceramic capacitor of preferred embodiments of the present invention, the multilayer ceramic capacitor was manufactured as a sample of an experiment, and the experiment in which a dielectric breakdown voltage (BDV) of the multilayer ceramic capacitor was measured was conducted.

As an experimental example, the multilayer ceramic capacitors in FIGS. 4 to 9 were prepared as an internal structure. As a comparative example, the multilayer ceramic capacitors in FIGS. 10A to 12B including no recess in the first internal electrode layer were prepared. The example and the comparative example were prepared such that the capacitance, the rated voltage, and the thickness of the dielectric layer were the same or substantially the same.

(1) Specification of Sample in Example

First, the multilayer ceramic capacitors of a first example to a fourth example according to preferred embodiments of the present invention having the following specifications were prepared according to the method for manufacturing the multilayer ceramic capacitor described above.

First Example

Structure of multilayer ceramic capacitor: three terminals (see FIG. 1)
Dimensions of multilayer ceramic capacitor L×W×T (including design values): about 1.6 mm×about 0.8 mm×about 0.6 mm
Material of dielectric layer: BaTiO$_3$
Capacitance: about 0.47 nF
Rated voltage: about 100 V
Thickness of dielectric layer: about 23.3 μm
Structure of LT section: see FIG. 8
Structure of WT section: see FIG. 9
Structure of internal electrode layer
First internal electrode layer
Material: Ni
  Shape: see FIG. 6
  Number of sheets: 65 sheets
  Thickness: about 1.0 μm
  Second internal electrode layer
Material: Ni
  Shape: see FIG. 7
  Number of sheets: 3 sheets
  Thickness: about 1.0 μm
  Structure of external electrode
  First external electrode and second external electrode Ground electrode layer: baked layer including conductive metal (Cu) and glass component
Thickness of central portion of end surface: about 45 μm
Plating layer: two-layer structure of Ni plating layer and Sn plating layer
Thickness of Ni plating layer: about 4 μm
Thickness of Sn plating layer: about 4 μm
Third external electrode and fourth external electrode
Ground electrode layer: baked layer including conductive metal (Cu) and glass component
Thickness of central portion of end surface: about 30 μm
Plating layer: two-layer structure of Ni plating layer and Sn plating layer
Thickness of Ni plating layer: about 4 μm
Thickness of Sn plating layer: about 4 μm Second Example Structure of multilayer ceramic capacitor: three terminals (see FIG. 1)
Dimensions of multilayer ceramic capacitor L×W×T (including design values): about 1.6 mm×about 0.8 mm×about 0.6
Material of dielectric layer: $BaTiO_3$
Capacitance: about 0.33 nF
Rated voltage: about 100 V
Thickness of dielectric layer: about 30.0 μm
Structure of LT section: see FIG. 8
Structure of WT section: see FIG. 9
Structure of internal electrode layer
First internal electrode layer
Material: Ni
Shape: see FIG. 6
Number of sheets: 57 sheets
Thickness: about 1.0 μm
Second internal electrode layer
Material: Ni
Shape: see FIG. 7
Number of sheets: 3 sheets
Thickness: about 1.0 μm
Structure of external electrode
First external electrode and second external electrode
Ground electrode layer: baked layer including conductive metal (Cu) and glass component
Thickness of central portion of end surface: 45 μm Plating layer: two-layer structure of Ni plating layer and Sn plating layer
Thickness of Ni plating layer: about 4 μm
Thickness of Sn plating layer: about 4 μm
Third external electrode and fourth external electrode
Ground electrode layer: baked layer including conductive metal (Cu) and glass component
Thickness of central portion of end surface: about 30 μm
Plating layer: two-layer structure of Ni plating layer and Sn plating layer
Thickness of Ni plating layer: about 4 μm
Thickness of Sn plating layer: about 4 μm Third Example Structure of multilayer ceramic capacitor: three terminals (see FIG. 1)
Dimensions of multilayer ceramic capacitor L×W×T (including design values): about 1.6 mm×about 0.8 mm×about 0.6
Material of dielectric layer: $BaTiO_3$
Capacitance: about 0.22 nF
Rated voltage: about 100 V
Thickness of dielectric layer: about 37.7 μm
Structure of LT section: see FIG. 4
Structure of WT section: see FIG. 5
Structure of internal electrode layer
First internal electrode layer
Material: Ni
Shape: see FIG. 6
Number of sheets: 70 sheets
Thickness: about 1.0 μm
Second internal electrode layer
Material: Ni
Shape: see FIG. 7
Number of sheets: 2 sheets
Thickness: about 1.0 μm
Structure of external electrode
First external electrode and second external electrode
Ground electrode layer: baked layer including conductive metal (Cu) and glass component
Thickness of central portion of end surface: about 45 μm
Plating layer: two-layer structure of Ni plating layer and Sn plating layer
Thickness of Ni plating layer: about 4 μm
Thickness of Sn plating layer: about 4 μm
Third external electrode and fourth external electrode
Ground electrode layer: baked layer including conductive metal (Cu) and glass component
Thickness of central portion of end surface: about 30 μm
Plating layer: two-layer structure of Ni plating layer and Sn plating layer
Thickness of Ni plating layer: about 4 μm
Thickness of Sn plating layer: about 4 μm Fourth Example Structure of multilayer ceramic capacitor: three terminals (see FIG. 1)
Dimensions of multilayer ceramic capacitor L×W×T (including design values): about 1.6 mm×about 0.8 mm×about 0.6 mm
Material of dielectric layer: $BaTiO_3$
Capacitance: about 0.10 nF
Rated voltage: about 100 V
Thickness of dielectric layer: about 75.7 μm
Structure of LT section: see FIG. 4
Structure of WT section: see FIG. 5
Structure of internal electrode layer
First internal electrode layer
Material: Ni
Shape: see FIG. 6
Number of sheets: 70 sheets
Thickness: about 1.0 μm
Second internal electrode layer
Material: Ni
Shape: see FIG. 7
Number of sheets: 2 sheets
Thickness: about 1.0 μm
Structure of external electrode
First external electrode and second external electrode
Ground electrode layer: baked layer including conductive metal (Cu) and glass component
Thickness of central portion of end surface: about 45 μm
Plating layer: two-layer structure of Ni plating layer and Sn plating layer
Thickness of Ni plating layer: about 4 μm
Thickness of Sn plating layer: about 4 μm
Third external electrode and fourth external electrode Ground electrode layer: baked layer including conductive metal (Cu) and glass component
Thickness of central portion of end surface: about 30 μm
Plating layer: two-layer structure of Ni plating layer and Sn plating layer
Thickness of Ni plating layer: about 4 μm
Thickness of Sn plating layer: about 4 μm (2) Specification of Sample in Comparative Example Subsequently, the multilayer ceramic capacitors of a first comparative example to a fourth comparative example having the following specifications were prepared.

As compared with the multilayer ceramic capacitors of the first example and the second example, the multilayer ceramic capacitors of the first comparative example and the second comparative example are the same or substantially the same three-terminal multilayer ceramic capacitors as the multilayer ceramic capacitors of the first example and the second example except that the recess is not provided in the first internal electrode layer.

Figure 10A:
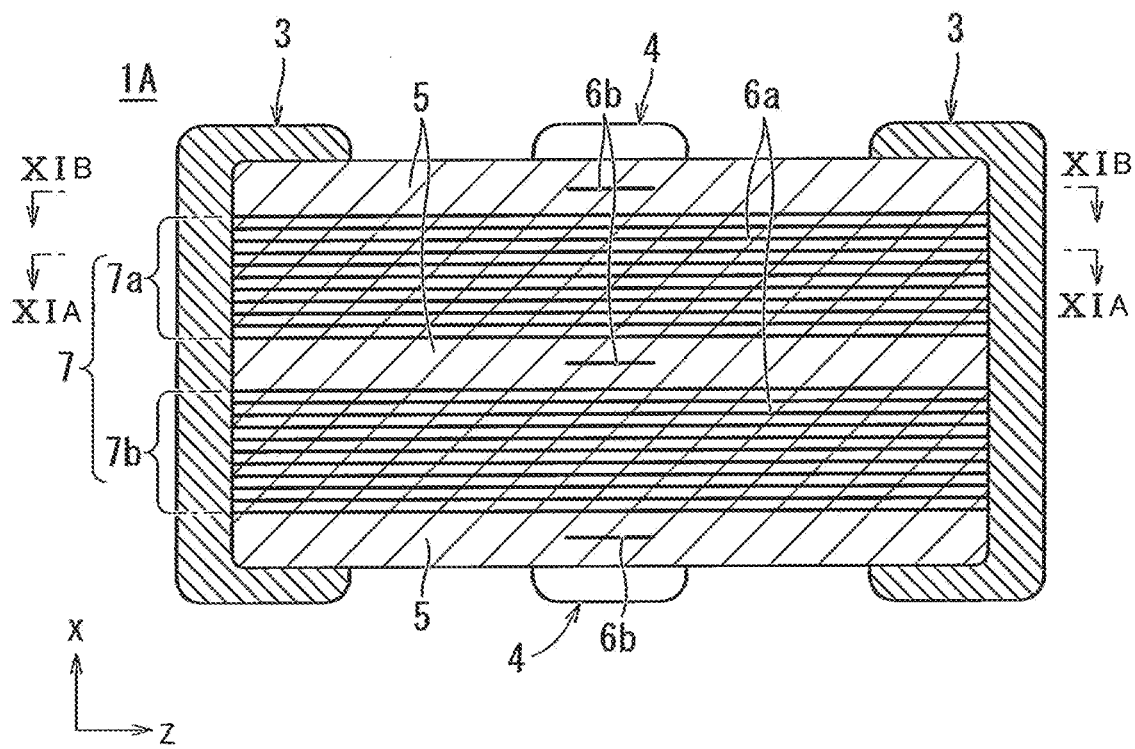
FIG. 10A is an LT sectional view illustrating an example of multilayer ceramic capacitors according to a first comparative example and a second comparative example.
Figure 10B:
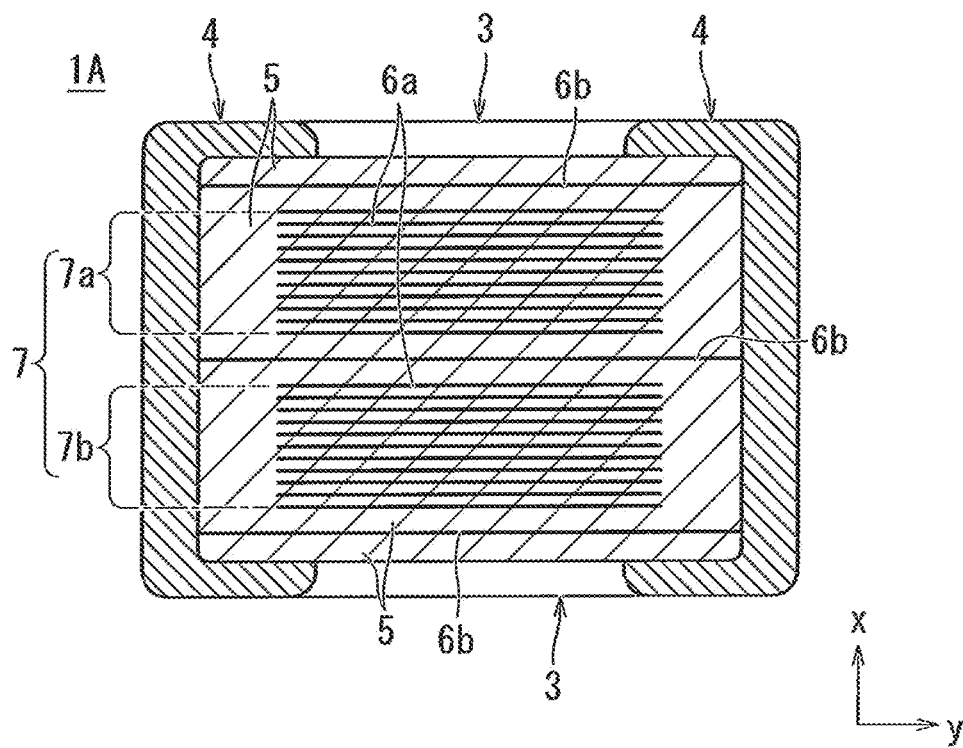
FIG. 10B is a WT sectional view illustrating the example of the multilayer ceramic capacitors according to the first comparative example and the second comparative example.
Figure 11A:
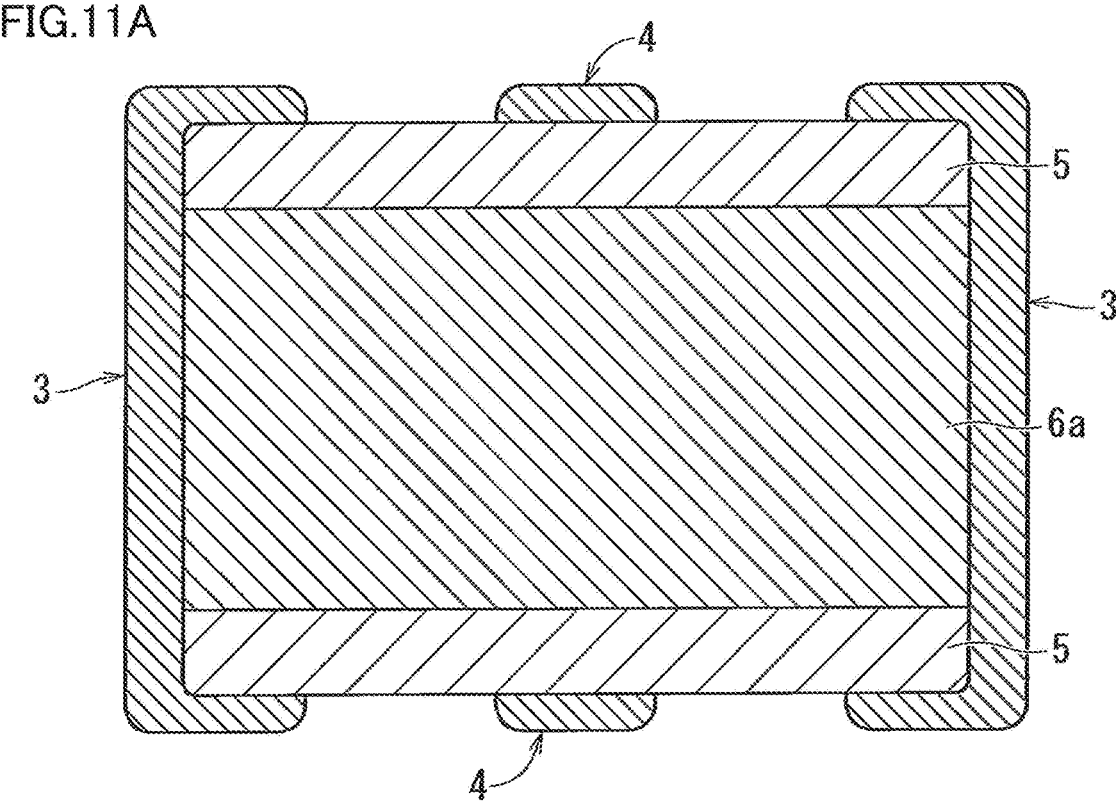
FIG. 11A is a sectional view taken along a line XIA-XIA in FIG. 10A.
Figure 11B:
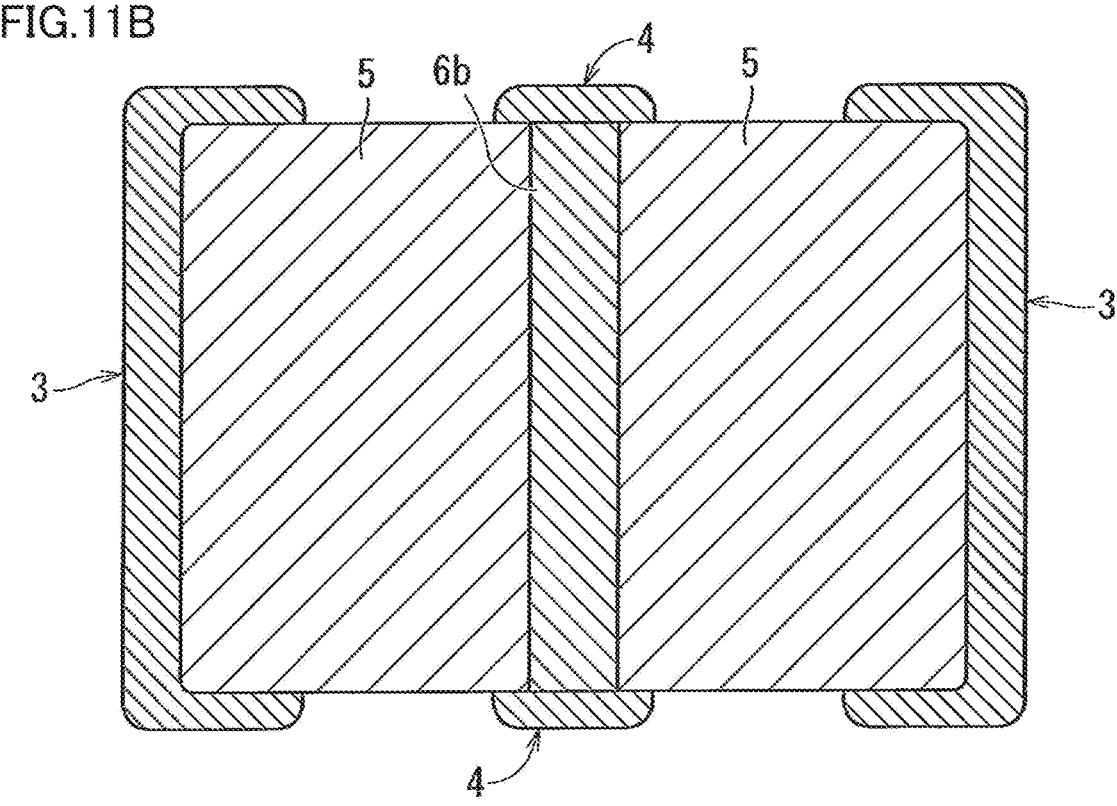
FIG. 11B is a sectional view taken along a line XIB-XIB in FIG. 10A.

FIG. 10A is an LT sectional view illustrating an example of the multilayer ceramic capacitor of the first comparative example and the second comparative example, and FIG. 10B is a WT sectional view thereof. Each of multilayer ceramic capacitors 1A of the first comparative example and the second comparative example includes a rectangular parallelepiped multilayer body 2, an external electrode 3 disposed on both end surfaces of multilayer body 2, and an external electrode 4 disposed on both side surfaces of external electrode 3. Multilayer body 2 includes a plurality of laminated dielectric layers 5, and a plurality of first internal electrode layers 6a and second internal electrode layers 6b that are laminated on dielectric layers 5. A second internal electrode layer 6b is disposed so as to divide an internal electrode multilayer unit 7 that is a region where at least two first internal electrode layers 6a are continuously laminated. At this point, internal electrode multilayer unit 7 is divided into a first internal electrode multilayer unit 7a and a second internal electrode multilayer unit 7b by one second internal electrode layer 6b.

Details of the specification will be described below.

First Comparative Example

Structure of multilayer ceramic capacitor: three terminals (see FIG. 9)
Dimensions of multilayer ceramic capacitor L×W×T (including design values): about 1.6 mm×about 0.8 mm×about 0.6 mm
Material of dielectric layer: BaTiO₃
Capacitance: about 0.47 μF
Rated voltage: 100 V
Thickness of dielectric layer: about 23.3 μm
Structure of LT section: see FIG. 10A
Structure of WT section: see FIG. 10B
Structure of internal electrode layer
First internal electrode layer
Material: Ni
Shape: see FIG. 11A
Number of sheets: 65 sheets
Thickness: about 1.0 μm
Second internal electrode layer
Material: Ni
Shape: see FIG. 11B
Number of sheets: 3 sheets
Thickness: about 1.0 μm
Structure of external electrode
First external electrode and second external electrode
Ground electrode layer: baked layer including conductive metal (Cu) and glass component
Thickness of central portion of end surface: about 45 μm
Plating layer: two-layer structure of Ni plating layer and Sn plating layer
Thickness of Ni plating layer: about 4 μm
Thickness of Sn plating layer: about 4 μm
Third external electrode and fourth external electrode
Ground electrode layer: baked layer including conductive metal (Cu) and glass component
Thickness of central portion of end surface: about 30 μm
Plating layer: two-layer structure of Ni plating layer and Sn plating layer
Thickness of Ni plating layer: about 4 μm
Thickness of Sn plating layer: about 4 μm Second Comparative Example Structure of multilayer ceramic capacitor: three terminals (see FIG. 9)
Dimensions of multilayer ceramic capacitor L×W×T (including design values): about 1.6 mm×about 0.8 mm×about 0.6 mm
Material of dielectric layer: BaTiO₃
Capacitance: about 0.33 μF
Rated voltage: about 100 V
Thickness of dielectric layer: about 30.0 μm
Structure of LT section: see FIG. 10A
Structure of WT section: see FIG. 10B
Structure of internal electrode layer
First internal electrode layer
Material: Ni
Shape: see FIG. 11A
Number of sheets: 57 sheets
Thickness: about 1.0 μm
Second internal electrode layer
Material: Ni
Shape: see FIG. 11B
Number of sheets: 3 sheets
Thickness: about 1.0 μm
Structure of external electrode
First external electrode and second external electrode
Ground electrode layer: baked layer including conductive metal (Cu) and glass component
Thickness of central portion of end surface: about 45 μm
Plating layer: two-layer structure of Ni plating layer and Sn plating layer
Thickness of Ni plating layer: about 4 μm
Thickness of Sn plating layer: about 4 μm
Third external electrode and fourth external electrode
Ground electrode layer: baked layer including conductive metal (Cu) and glass component
Thickness of central portion of end surface: about 30 μm
Plating layer: two-layer structure of Ni plating layer and Sn plating layer
Thickness of Ni plating layer: about 4 μm
Thickness of Sn plating layer: about 4 μm As compared with the multilayer ceramic capacitors of the third example and the fourth example, the multilayer ceramic capacitors of the third comparative example and the fourth comparative example are the same or substantially the same three-terminal multilayer ceramic capacitors as the multilayer ceramic capacitors of the third example and the fourth example except that the recess is not provided in the first internal electrode layer.

Figure 12A:
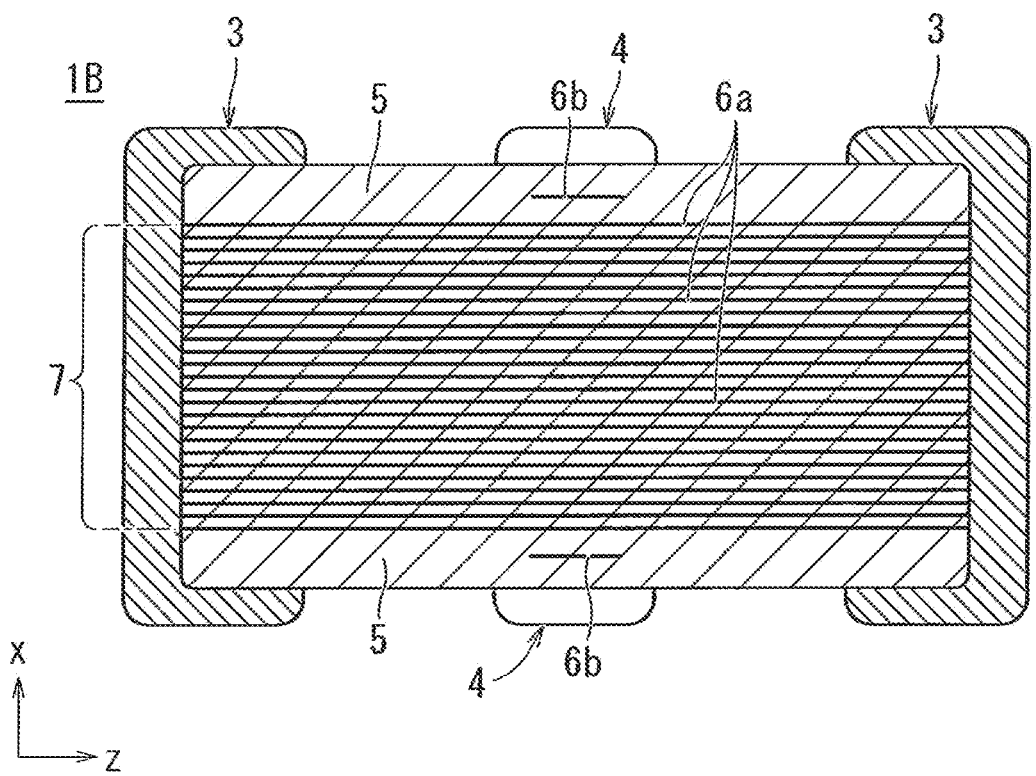
FIG. 12A is a sectional view corresponding to FIG. 4, and illustrating an example of multilayer ceramic capacitors according to a third comparative example and a fourth comparative example.
Figure 12B:
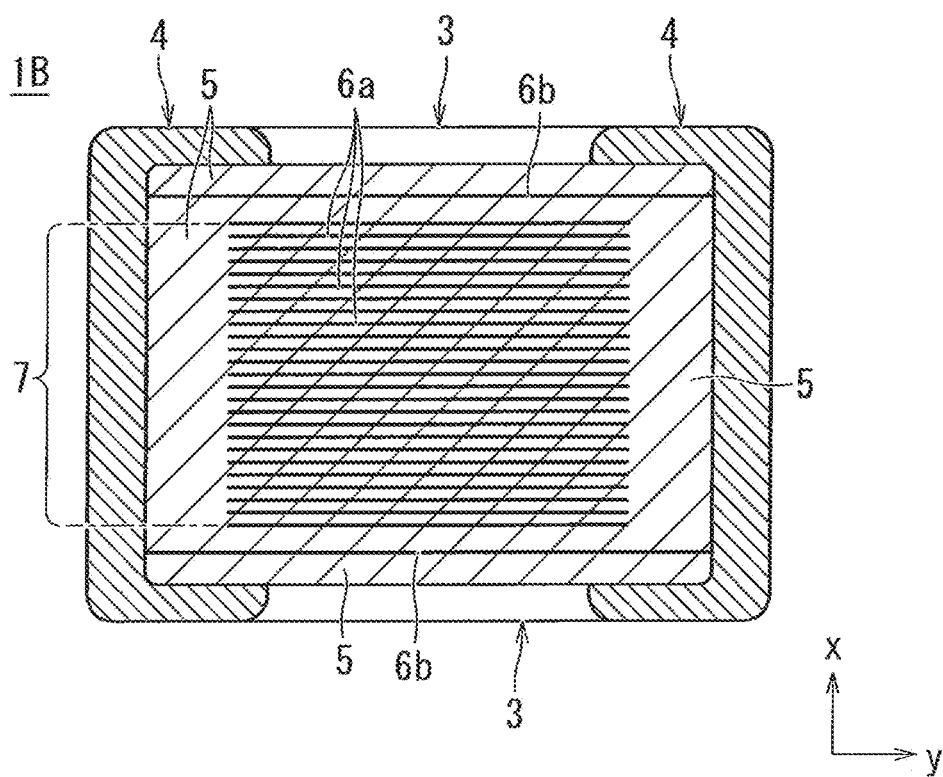
FIG. 12B is a sectional view corresponding to FIG. 5, and illustrating the example of the multilayer ceramic capacitors according to the third comparative example and the fourth comparative example.

FIG. 12A is a sectional view corresponding to FIG. 4, and illustrating an example of the multilayer ceramic capacitor of the third comparative example and the fourth comparative example, and FIG. 12B is a sectional view corresponding to FIG. 5. A multilayer ceramic capacitor 1B of the second comparative example includes a rectangular or substantially rectangular parallelepiped multilayer body 2, external electrodes 3 disposed on both end surfaces of multilayer body 2, and external electrodes 4 disposed on both side surfaces of multilayer body 2. Multilayer body 2 includes a plurality of laminated dielectric layers 5, and a plurality of first internal electrode layers 6a and second internal electrode layers 6b that are laminated on dielectric layers 5. The number of first internal electrode layers 6a is greater than the number of second internal electrode layers 6b, and at least two of first internal electrode layers 6a are continuously laminated. In multilayer ceramic capacitor 1B of FIGS. 12A and 12B, second internal electrode layer 6b is disposed between first internal electrode layer 6a located closest to the first principal surface and the first principal surface, and between first internal electrode layer 6a located closest to the second principal surface and the second principal surface. Internal electrode multilayer unit 7 is not divided by first internal electrode layer 6a.

Details of the specification will be described below.

Third Comparative Example

Structure of multilayer ceramic capacitor: three terminals (see FIG. 9)
Dimensions of multilayer ceramic capacitor L×W×T (including design values): about 1.6 mm×about 0.8 mm×about 0.6
Material of dielectric layer: $BaTiO_3$
Capacitance: about 0.22 μF
Rated voltage: about 100 V
Thickness of dielectric layer: about 37.7 μm
Structure of LT section: see FIG. 12A
Structure of WT section: see FIG. 12B
Structure of internal electrode layer
First internal electrode layer
Material: Ni
　Shape: see FIG. 11A
　Number of sheets: 70 sheets
　Thickness: about 1.0 μm
　Second internal electrode layer
Material: Ni
　Shape: see FIG. 11B
　Number of sheets: 2 sheets
　Thickness: about 1.0 μm
　Structure of external electrode
　First external electrode and second external electrode
　Ground electrode layer: baked layer including conductive metal (Cu) and glass component
　　Thickness of central portion of end surface: about 45 μm
　　Plating layer: two-layer structure of Ni plating layer and Sn plating layer
　　　Thickness of Ni plating layer: about 4 μm
　　　Thickness of Sn plating layer: about 4 μm
　Third external electrode and fourth external electrode
　Ground electrode layer: baked layer including conductive metal (Cu) and glass component
　　Thickness of central portion of end surface: about 30 μm
　　Plating layer: two-layer structure of Ni plating layer and Sn plating layer
　　　Thickness of Ni plating layer: about 4 μm
　　　Thickness of Sn plating layer: about 4 μm Comparative Example 4

Structure of multilayer ceramic capacitor: three terminals (see FIG. 9)
Dimensions of multilayer ceramic capacitor L×W×T (including design values): about 1.6 mm×about 0.8 mm×about 0.6
Material of dielectric layer: $BaTiO_3$
Capacitance: about 0.10 μF
Rated voltage: about 100 V
Thickness of dielectric layer: about 75.7 μm
Structure of LT section: see FIG. 12A
Structure of WT section: see FIG. 12B
Structure of internal electrode layer
First internal electrode layer
Material: Ni
　Shape: see FIG. 11A
　Number of sheets: 70 sheets
　Thickness: about 1.0 μm
　Second internal electrode layer
Material: Ni
　Shape: see FIG. 11B
　Number of sheets: 2 sheets
　Thickness: about 1.0 μm
　Structure of external electrode
　First external electrode and second external electrode
　Ground electrode layer: baked layer including conductive metal (Cu) and glass component
　　Thickness of central portion of end surface: about 45 μm
　　Plating layer: two-layer structure of Ni plating layer and Sn plating layer
　　　Thickness of Ni plating layer: about 4 μm
　　　Thickness of Sn plating layer: about 4 μm
　Third external electrode and fourth external electrode
　Ground electrode layer: baked layer including conductive metal (Cu) and glass component
　　Thickness of central portion of end surface: about 30 μm
　　Plating layer: two-layer structure of Ni plating layer and Sn plating layer
　　　Thickness of Ni plating layer: about 4 μm
　　　Thickness of Sn plating layer: about 4 μm (3) Method for Measuring Capacitance The capacitance was measured using a capacitance measuring device (LCR meter) under a measurement condition based on a standard specification (JIS C 5101-1: 2010).

(4) Method for Measuring Thickness of Dielectric Layer

For the samples of the respective examples and the respective comparative examples, the thickness of the dielectric layer was measured as follows.

That is, first, a periphery of the multilayer ceramic capacitor that is the sample was solidified with resin. At this time, an LT side surface of the multilayer ceramic capacitor that is each sample was exposed. The LT side surface is a length and height side surface, and is a side surface in which the internal electrode layer is exposed including a connection portion to the external electrode by polished. The LT side surface was polished with a polishing machine, and the polishing is finished at a depth of about ½ in width direction y of the multilayer body to expose the LT section. The polished surface was subjected to ion milling to remove sagging due to the polishing, thereby obtaining a section for observation.

Figure 13:
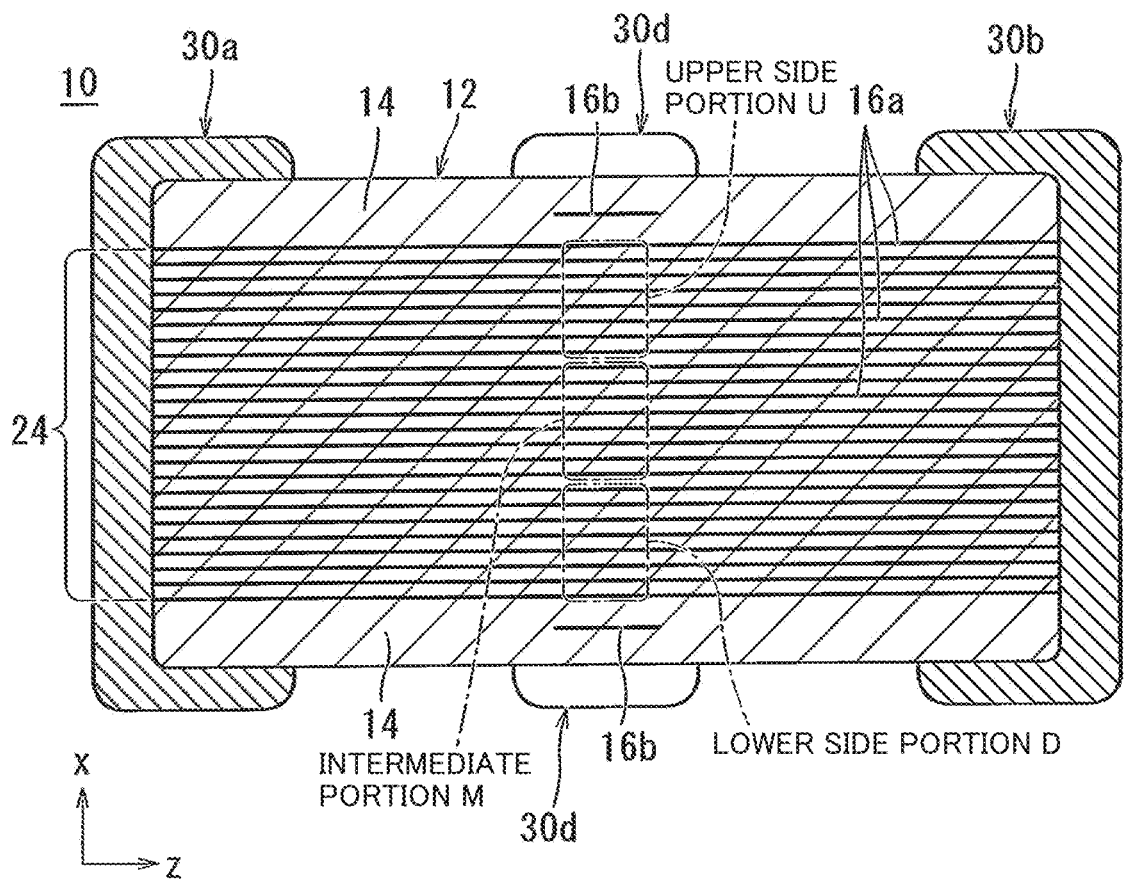
FIG. 13 is a graphical sectional view illustrating a non-limiting example of a method for measuring a thickness of a dielectric layer.

Subsequently, as illustrated in FIG. 13, a perpendicular line orthogonal or substantially orthogonal to the internal electrode layer was drawn at a position of about ½ in length direction z of the LT section. Subsequently, the region (internal electrode multilayer unit) where the internal electrode layers of the sample are laminated is divided into three equal portions in height direction x, and divided into three regions of an upper side portion U, an intermediate portion M, and a lower side portion D. Then, five dielectric layers were selected from the central portion in height direction x of each region, and the thicknesses of these dielectric layers on the perpendicular line were measured. From the above, for each sample, the thicknesses of the dielectric layer and the internal electrode layer were measured at a total of 15 locations of 3 regions×5 layers, and an average value thereof was calculated.

The thickness of the dielectric layer was measured using a scanning electron microscope.

(5) Method for Measuring Dielectric Breakdown Voltage

In the multilayer ceramic capacitors that are the samples of the examples and the comparative examples, wiring was connected to the first external electrode and the second external electrode from a DC power supply, the voltage was applied between the first internal electrode layer and the second internal electrode layer, and the voltage causing dielectric breakdown was measured. At this point, the boosting speed was set to about 50 V/s, and the detection current was set to about 83 mA.

Figure 14:
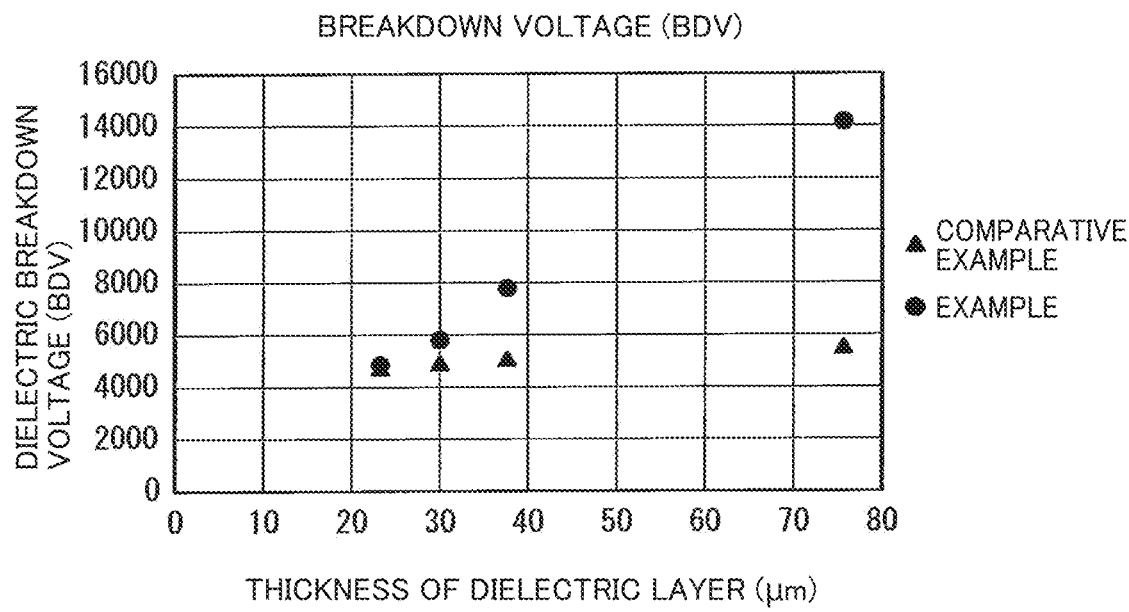
FIG. 14 is a view illustrating a relationship between an element thickness and a breakdown voltage in each sample of examples and comparative examples.

As an experimental result, the measurement results of the dielectric breakdown voltage are illustrated in Table 1 and FIG. 14.

TABLE 1

| | Capacitance (nF) | Rated voltage (V) | Thickness of dielectric layer (μm) | Dielectric breakdown voltage (BDV) (V) |
|---|---|---|---|---|
| First example | 0.47 | 100 | 23.3 | 4870 |
| Second example | 0.33 | 100 | 30.0 | 5790 |
| Third example | 0.22 | 100 | 37.7 | 7840 |
| Fourth example | 0.10 | 100 | 75.7 | 14120 |
| First comparative example | 0.47 | 100 | 23.3 | 4710 |
| Second comparative example | 0.33 | 100 | 30.0 | 4870 |
| Third comparative example | 0.22 | 100 | 37.7 | 5028 |
| Fourth comparative example | 0.10 | 100 | 75.7 | 5409 |

(6) Experimental Results

According to Table 1 and FIG. 14, in the structures of the first comparative example to fourth comparative example, when the high electric field was applied, sometimes the dielectric breakdown is generated between the third external electrode and the fourth external electrode that are disposed on a portion of the first principal surface and a portion of the second principal surface and the first internal electrode layer, and a phenomenon in which the dielectric breakdown voltage (BDV) did not increase so much although the thickness of the dielectric layer increases from the first comparative example toward the fourth comparative example is generated.

On the other hand, in the structures of preferred embodiments of the present invention of the first examples to the fourth example, the result that the dielectric breakdown voltage (BDV) as the multilayer ceramic capacitor significantly increased as the thickness of the dielectric layer increased from the first example to the fourth example was obtained.

From the above, it was illustrated that according to the structure of the sample of the multilayer ceramic capacitor according to the example, the dielectric breakdown can be reduced or prevented between the third external electrode and the fourth external electrode that are connected to the second internal electrode layer and the first internal electrode layer. As a result, it has become clear that a dielectric breakdown voltage (BDV) of the multilayer ceramic capacitor can be improved.

As described above, the preferred embodiments of the present invention are disclosed in the above description, but the present invention is not limited thereto.

That is, various changes can be made to the mechanism, shape, material, quantity, position, disposition, and the like with respect to the preferred embodiments described above without departing from the scope of the present invention, and these changes are included in the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
  a multilayer body including a plurality of laminated dielectric layers, the multilayer body including a first principal surface and a second principal surface facing each other in a height direction, a first end surface and a second end surface facing each other in a length direction orthogonal or substantially orthogonal to the height direction, and a first side surface and a second side surface facing each other in a width direction orthogonal or substantially orthogonal to the height direction and the length direction;
  a plurality of first internal electrode layers on the plurality of dielectric layers and extending to the first end surface and the second end surface;
  a plurality of second internal electrode layers on the plurality of dielectric layers and extending to the first side surface and the second side surface;
  a first external electrode on the first end surface and connected to the first internal electrode layer;
  a second external electrode on the second end surface and connected to the first internal electrode layer;
  a third external electrode on the first side surface, extending from the first side surface to a portion of the first principal surface and a portion of the second principal surface, and connected to the second internal electrode layer; and a fourth external electrode on the second side surface, extending from the second side surface to a portion of the first principal surface and a portion of the second principal surface, and connected to the second internal electrode layer; wherein a number of the first internal electrode layers is greater than a number of the second internal electrode layers, and at least two first internal electrode layers are continuously laminated;

the first internal electrode layer includes a recess not overlapping the third external electrode on a portion of the first principal surface and a portion of the second principal surface and the fourth external electrode on a portion of the first principal surface and a portion of the second principal surface when the multilayer ceramic capacitor is viewed from the height direction;

the second internal electrode layer is between the first internal electrode layer located closest to the first principal surface and the first principal surface and between the first internal electrode layer located closest to the second principal surface and the second principal surface;

a length in the length direction of the second internal electrode layer is smaller than a maximum length in the length direction of the third external electrode on a portion of the first principal surface and a portion of the second principal surface and the fourth external electrode on a portion of the first principal surface and a portion of the second principal surface;

when the multilayer ceramic capacitor is viewed from the height direction, at least a portion of the recess is located between the third external electrode on the portion of the first principal surface and the portion of the second principal surface and the fourth external electrode on the portion of the first principal surface and the portion of the second principal surface;

when the multilayer ceramic capacitor is viewed from the height direction, a distance on a same plane between sides at an end of the third external electrode disposed on the portion of the first principal surface and the portion of the second principal surface and an end of the fourth external electrode disposed on the portion of the first principal surface and the portion of the second principal surface and a side at the end of the recess of the first internal electrode layer is greater than or equal to about 100 μm;

the multilayer body includes:
  a pair of capacitance generators arranged in the height direction, in which the plurality of first internal electrode layers and the plurality of second internal electrode layers face each other with the plurality of dielectric layers interposed therebetween to generate a capacitance; and
  an internal electrode multilayer unit arranged between the pair of capacitance generators and in which two or more of the first internal electrode layers are continuously laminated;
one of the pair of capacitance generators includes:
  one of the second internal electrode layers that is located on a first main surface side with respect to the internal electrode multilayer unit; and
  the first internal electrode layer located closest to the first main surface side of the internal electrode multilayer unit; and the other of the pair of capacitance generators includes:
  one of the second internal electrode layers located on a second main surface side with respect to the internal electrode multilayer unit; and
  the first internal electrode layer located closest to the second main surface side of the internal electrode multilayer unit.

2. The multilayer ceramic capacitor according to claim 1, wherein
  the second internal electrode layer includes a region extending between the first side surface and the second side surface of the multilayer body and located at a central portion of the dielectric layer and a region extending from the region located at the central portion of the dielectric layer to the first side surface and the second side surface; and
  a length in a length direction connecting the first end surface and the second end surface in a region located in the central portion of the dielectric layer is identical or substantially identical to a length in a length direction connecting the first end surface and the second end surface in the extending region.

3. The multilayer ceramic capacitor according to claim 1, wherein the second internal electrode layer divides a region where at least two first internal electrode layers are continuously laminated into a plurality of portions.

4. The multilayer ceramic capacitor according to claim 3, wherein only the second internal electrode layer divides the region where the at least two first internal electrode layers are continuously laminated into the plurality of portions.

5. The multilayer ceramic capacitor according to claim 3, wherein at least two second internal electrode layers divide the region where at least two first internal electrode layers are continuously laminated into the plurality of portions.

6. The multilayer ceramic capacitor according to claim 1, wherein a thickness of a dielectric layer located between the first internal electrode layer and the second internal electrode layer is greater than a thickness of a dielectric layer located between the first internal electrode layers.

7. The multilayer ceramic capacitor according to claim 6, wherein the thickness of the dielectric layer located between the first internal electrode layer and the second internal electrode layer is greater than or equal to about 30 μm.

8. The multilayer ceramic capacitor according to claim 1, wherein a shortest distance in the width direction of the first internal electrode layer in a portion where the recess is provided is shorter than a shortest distance of the first internal electrode layer in a portion where the recess is not provided.

9. The multilayer ceramic capacitor according to claim 1, wherein the multilayer body has a rectangular or substantially rectangular parallelepiped shape.

10. The multilayer ceramic capacitor according to claim 1, wherein each of the plurality of dielectric layers includes at least one of $BaTiO_3$, $CaTiO_3$, $SrTiO_3$, or $CaZrO_3$ as a main component.

11. The multilayer ceramic capacitor according to claim 10, wherein each of the plurality of dielectric layers includes at least one of an Mn compound, an Fe compound, a Cr compound, a Co compound, or an Ni compound as a sub-component.

12. The multilayer ceramic capacitor according to claim 1, wherein a thickness of each of the plurality of dielectric layers is greater than or equal to about 30 μm and less than or equal to about 80 μm.

13. The multilayer ceramic capacitor according to claim 1, wherein a number of the plurality of dielectric layers is greater than or equal to 15 and less than or equal to 300.

14. The multilayer ceramic capacitor according to claim 1, wherein a total number of the plurality of first internal electrode layers and the plurality of second internal electrode layers is greater than or equal to 15 and less than or equal to 200.

15. The multilayer ceramic capacitor according to claim 1, wherein a number of the plurality of first internal electrode layers is greater than or equal to 50 and less than or equal to 100.

16. The multilayer ceramic capacitor according to claim 1, wherein a number of the plurality of second internal electrode layers is greater than or equal to 1 and less than or equal to 20.

17. The multilayer ceramic capacitor according to claim 1, wherein a thickness of each of the plurality of first internal electrode layers and the plurality of second internal electrode layers is greater than or equal to about 0.5 μm and less than or equal to about 2.0 μm.

18. The multilayer ceramic capacitor according to claim 1, wherein each of the plurality of first internal electrode layers and the plurality of second internal electrode layers includes at least one of Ni, Cu, Ag, Pd, or Au, or an alloy including at least one of Ni, Cu, Ag, Pd, or Au.

19. The multilayer ceramic capacitor according to claim 1, wherein two or more of the plurality of second internal electrode layers are not arranged consecutively in the height direction.

20. A multilayer ceramic capacitor comprising:
a multilayer body including a plurality of laminated dielectric layers, the multilayer body including a first principal surface and a second principal surface facing each other in a height direction, a first end surface and a second end surface facing each other in a length direction orthogonal or substantially orthogonal to the height direction, and a first side surface and a second side surface facing each other in a width direction orthogonal or substantially orthogonal to the height direction and the length direction;
a plurality of first internal electrode layers on the plurality of dielectric layers and extending to the first end surface and the second end surface;
a plurality of second internal electrode layers on the plurality of dielectric layers and extending to the first side surface and the second side surface;
a first external electrode on the first end surface and connected to the first internal electrode layer;
a second external electrode on the second end surface and connected to the first internal electrode layer;
a third external electrode on the first side surface, extending from the first side surface to a portion of the first principal surface and a portion of the second principal surface, and connected to the second internal electrode layer; and
a fourth external electrode on the second side surface, extending from the second side surface to a portion of the first principal surface and a portion of the second principal surface, and connected to the second internal electrode layer; wherein a number of the first internal electrode layers is greater than a number of the second internal electrode layers, and at least two first internal electrode layers are continuously laminated;
the first internal electrode layer includes a recess not overlapping the third external electrode on a portion of the first principal surface and a portion of the second principal surface and the fourth external electrode on a portion of the first principal surface and a portion of the second principal surface when the multilayer ceramic capacitor is viewed from the height direction;
the second internal electrode layer is between the first internal electrode layer located closest to the first principal surface and the first principal surface and between the first internal electrode layer located closest to the second principal surface and the second principal surface;
a length in the length direction of the second internal electrode layer is smaller than a maximum length in the length direction of the third external electrode on a portion of the first principal surface and a portion of the second principal surface and the fourth external electrode on a portion of the first principal surface and a portion of the second principal surface;
when the multilayer ceramic capacitor is viewed from the height direction, at least a portion of the recess is located between the third external electrode on the portion of the first principal surface and the portion of the second principal surface and the fourth external electrode on the portion of the first principal surface and the portion of the second principal surface;
a distance in the width direction between sides at an end of the third external electrode disposed on the portion of the first principal surface and the portion of the second principal surface and an end of the fourth external electrode disposed on the portion of the first principal surface and the portion of the second principal surface and a side at the end of the recess of the first internal electrode layer is greater than or equal to about 100 μm; and
the multilayer body includes:
a pair of capacitance generators arranged in the height direction, in which the plurality of first internal electrode layers and the plurality of second internal electrode layers face each other with the plurality of dielectric layers interposed therebetween to generate a capacitance; and
an internal electrode multilayer unit arranged between the pair of capacitance generators and in which two or more of the first internal electrode layers are continuously laminated;
one of the pair of capacitance generators includes:
one of the second internal electrode layers that is located on a first main surface side with respect to the internal electrode multilayer unit; and
the first internal electrode layer located closest to the first main surface side of the internal electrode multilayer unit; and
the other of the pair of capacitance generators includes:
one of the second internal electrode layers located on a second main surface side with respect to the internal electrode multilayer unit; and
the first internal electrode layer located closest to the second main surface side of the internal electrode multilayer unit.

* * * * *